United States Patent [19]

Shimada

[11] Patent Number: 4,847,788
[45] Date of Patent: Jul. 11, 1989

[54] GRAPHIC DATA PROCESSING METHOD AND SYSTEM

[75] Inventor: Shigeru Shimada, Kodaira, Japan

[73] Assignee: Hitachi, Ltd., Tokyo, Japan

[21] Appl. No.: 828,711

[22] Filed: Feb. 12, 1986

[30] Foreign Application Priority Data

| Mar. 1, 1985 | [JP] | Japan | 60-38723 |
| Mar. 1, 1985 | [JP] | Japan | 60-38724 |
| Mar. 1, 1985 | [JP] | Japan | 60-38725 |
| Mar. 1, 1985 | [JP] | Japan | 60-38727 |

[51] Int. Cl.$^4$ ............................................. G06F 3/153
[52] U.S. Cl. .................................... 364/522; 364/521; 340/750
[58] Field of Search ............... 364/518, 521, 200, 522, 364/523; 340/995, 799, 724, 744, 734, 750; 382/9, 48; 52/236.7, 236.8

[56] References Cited

U.S. PATENT DOCUMENTS

| 4,366,475 | 12/1982 | Kishi et al. | 340/731 |
| 4,398,171 | 8/1983 | Dahan et al. | 340/22 |
| 4,414,628 | 11/1983 | Ahuja et al. | 364/200 |
| 4,550,317 | 10/1985 | Moriyama et al. | 340/995 |
| 4,550,434 | 10/1985 | Shimada et al. | 382/9 |
| 4,558,374 | 12/1985 | Kurata et al. | 358/287 |
| 4,630,209 | 12/1986 | Saito et al. | 364/444 |
| 4,661,811 | 4/1987 | Gray et al. | 340/744 |
| 4,672,683 | 6/1987 | Matsueda | 382/57 |
| 4,688,167 | 8/1987 | Agarwal | 364/200 |
| 4,737,916 | 4/1988 | Ogawa et al. | 364/443 |
| 4,737,927 | 4/1988 | Hanabusa et al. | 364/443 |
| 4,742,558 | 5/1988 | Ishibashi et al. | 382/56 |

OTHER PUBLICATIONS

Phillips, "Computer Graphics in Urban and Environmental Systems", Compcon 79, Tutorial: Computer Graphics, pp. 405-420.

Ejiri et al., "Automatic Recognition of Design Drawings and Maps", IEEE Computer Society, 8/84, pp. 1296–1305.

Primary Examiner—Gary V. Harkcom
Assistant Examiner—Phu Khac Nguyen
Attorney, Agent, or Firm—Antonelli, Terry & Wands

[57] ABSTRACT

A drawing processing system includes file storage equipment for storing drawing data in the form of pages through division of the drawing data, a memory for storing coordinate correcting values for managing pages in a continuated manner, and a temporary memory for storing page data for executing drawing edition processing. The drawing data are transferred from the file storage equipment to the temporary memory in a continuated manner, while the coordinate correcting values being added thereto. A joined drawing is prepared by combining together the pages along the boundaries thereof on the basis of the drawing data as transferred and by erasing the boundaries between the connected pages. Graphic edition processings such as displacement, joining, separation or the like can be then performed in the joined drawing.

26 Claims, 31 Drawing Sheets

FIG. 3a1
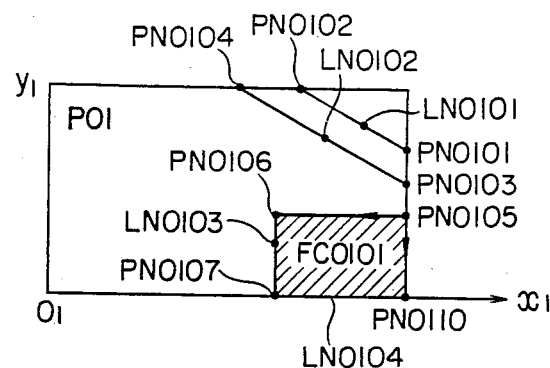
FIG. 3b1
| FACE-TABLE-01 | | | |
|---|---|---|---|
| FACE | LINE | L-ORDER | DIRECTION |
| FC0101 | LN0103 | 0 | 1 |
| FC0101 | LN0104 | 1 | 0 |
FIG. 3c1
| LINE-TABLE-01 | | |
|---|---|---|
| LINE | POINT | P-ORDER |
| LN0101 | PN0101 | 0 |
| LN0101 | PN0102 | 1 |
| LN0102 | PN0103 | 0 |
| LN0102 | PN0104 | 1 |
| LN0103 | PN0105 | 0 |
| LN0103 | PN0106 | 1 |
| LN0103 | PN0107 | 2 |
| LN0104 | PN0105 | 0 |
| LN0104 | PN0110 | 1 |
| LN0104 | PN0107 | 2 |
FIG. 3d1
| POINT-TABLE-01 | | |
|---|---|---|
| POINT | X | Y |
| PN0101 | 850 | 350 |
| PN0102 | 600 | 500 |
| PN0103 | 850 | 270 |
| PN0104 | 450 | 500 |
| PN0105 | 850 | 200 |
| PN0106 | 540 | 200 |
| PN0107 | 540 | 0 |
| PN0110 | 850 | 0 |

FIG. 3a2
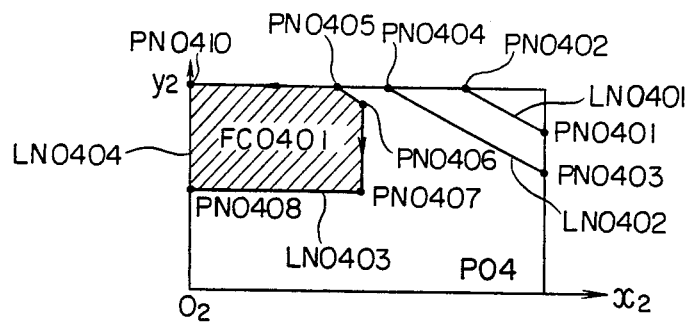
FIG. 3b2
| FACE-TABLE-04 | | | |
|---|---|---|---|
| FACE | LINE | L-ORDER | DIRECTION |
| FC0401 | LN0403 | 0 | 0 |
| FC0401 | LN0404 | 1 | 1 |
FIG. 3c2
| LINE-TABLE-04 | | |
|---|---|---|
| LINE | POINT | P-ORDER |
| LN0401 | PN0401 | 0 |
| LN0401 | PN0402 | 1 |
| LN0402 | PN0403 | 0 |
| LN0402 | PN0404 | 1 |
| LN0403 | PN0405 | 0 |
| LN0403 | PN0406 | 1 |
| LN0403 | PN0407 | 2 |
| LN0403 | PN0408 | 3 |
| LN0404 | PN0405 | 0 |
| LN0404 | PN0410 | 1 |
| LN0404 | PN0404 | 2 |
FIG. 3d2
| POINT-TABLE-04 | | |
|---|---|---|
| POINT | x | Y |
| PN0401 | 850 | 400 |
| PN0402 | 650 | 500 |
| PN0403 | 850 | 300 |
| PN0404 | 490 | 500 |
| PN0405 | 350 | 500 |
| PN0406 | 410 | 450 |
| PN0407 | 410 | 250 |
| PN0408 | 0 | 250 |
| PN0410 | 0 | 500 |

FIG. 3a3
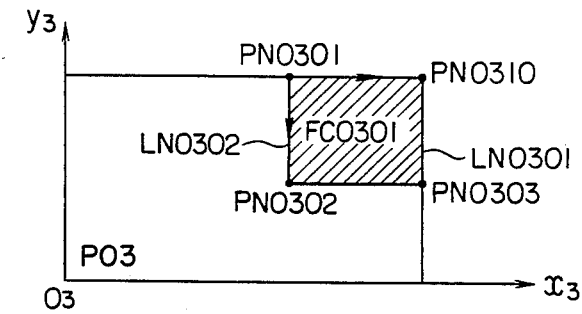
FIG. 3b3
| FACE-TABLE-03 | | | |
|---|---|---|---|
| FACE | LINE | L-ORDER | DIRECTION |
| FC0301 | LN0301 | 0 | 0 |
| FC0301 | LN0302 | 1 | 1 |
FIG. 3c3
| LINE-TABLE-03 | | |
|---|---|---|
| LINE | POINT | P-ORDER |
| LN0301 | PN0301 | 0 |
| LN0301 | PN0310 | 1 |
| LN0301 | PN0303 | 2 |
| LN0302 | PN0301 | 0 |
| LN0302 | PN0302 | 1 |
| LN0302 | PN0303 | 2 |
FIG. 3d3
| POINT-TABLE-03 | | |
|---|---|---|
| POINT | x | Y |
| PN0301 | 540 | 500 |
| PN0302 | 540 | 250 |
| PN0303 | 850 | 250 |
| PN0310 | 850 | 500 |

| FACE-TABLE-02 | | | |
|---|---|---|---|
| FACE | LINE | L-ORDER | DIRECTION |
| FC0201 | LN0203 | 0 | 1 |
| FC0201 | LN0204 | 1 | 0 |

| LINE-TABLE-02 | | |
|---|---|---|
| LINE | POINT | P-ORDER |
| LN0201 | PN0201 | 0 |
| LN0201 | PN0202 | 1 |
| LN0202 | PN0203 | 0 |
| LN0202 | PN0204 | 1 |
| LN0203 | PN0205 | 0 |
| LN0203 | PN0206 | 1 |
| LN0204 | PN0205 | 0 |
| LN0204 | PN0210 | 1 |
| LN0204 | PN0206 | 2 |

| POINT-TABLE-02 | | |
|---|---|---|
| POINT | x | Y |
| PN0201 | 650 | 0 |
| PN0202 | 0 | 370 |
| PN0203 | 480 | 0 |
| PN020 | 0 | 280 |
| PN0205 | 350 | 0 |
| PN0206 | 0 | 200 |
| PN0210 | 0 | 0 |

FIG. 4

| PAGE | APEXES OF PAGE BOUNDARY POLYGON | RELATIVE ROTATION | COMPENSATION FOR OFF-SET |
|---|---|---|---|
| P01 | ((X011,Y011)(X012,Y012)......(X01b,Y01k)) | TH01 | (XF01, YF01) |
| P02 | (X021,Y021)(X022,Y022).....(X02b,Y02l) | TH01 | (XF02, YF02) |
| P12 | ((X121,Y121)(X122,Y122).......(X12p,Y12p)) | TH01 | (XF12, YF12) |
| VP01 | ((VX011,VY011)(VX012,VY012)...(VX01k,VY01k)) | TH02 | (XVF01, YVF01) |
| VP02 | ((VX021,VY021)(VY022,VY022)..(VX02l,VY02l)) | TH02 | (XVF02, YVF02) |
| VP12 | ((VX121,VY121)(VX122,VY122)....(VX12p,VY12p)) | TH02 | (XVF12, YVF12) |

GROUP a: P01, P02, P12
GROUP b: VP01, VP02, VP12

FIG. 8

| REDUCTION | DATA | | AVAILABILITY |
|---|---|---|---|
| | SUBJECT | CONTENT | PAGE LIST |
| 1/2500 | TOPOGRAPHY | DISPLAY | (TM 25006 TM 25007 ...... TM 25027) |
| 1/1000 | TOPOGRAPHY | DISPLAY | (TM 10011 TM 10012 ...... TM 10017) |
| 1/1000 | POWER UTILIZATION | DISPLAY | (EL 10006 EL 10007 ...... EL 10022) |
| 1/1000 | POWER UTILIZATION | STRUCTURIZATION | (EL 10006 EL 10007 ...... EL 10011) |
| 1/2500 | GROUND UTILIZATION | DISPLAY | (SU 25008 SU 25009 ...... SU 25018) |

FIG. 9

| PAGE | PAGE BOUNDARY POLYGON |
|---|---|
| TM 10001 | $((X_{a1},Y_{a1})(X_{a2},Y_{a2})---(X_{am},Y_{am}))$ |
| TM 10002 | $((X_{b1},Y_{b1})(X_{b2},Y_{b2})---(X_{bm},Y_{bm}))$ |
| ⋮ | |
| TM 25001 | $((X_{e1},Y_{e1})(X_{e2},Y_{e2})---$ |
| TM 25002 | $((X_{f1},Y_{f1})(X_{f2},Y_{f2})---$ |
| ⋮ | |
| EL 10001 | $((X_{g1},Y_{g1})---$ |
| EL 10002 | $((X_{h1}\ Y_{h1})---$ |

FIG. 10

| DISPLAY MARK | | |
|---|---|---|
| CONTENTS | TEXTURE OF DISPLAY | DISPLAY COLOR |
| DISPLAY | HATCHING | YELLOW |
| STRUCTURI-ZATION | HATCHING | RED |
| SUBJECT | PASTEL DOTS | VIOLET |

FIG. 17

| PRIORITY | SUBJECT | REDUCTION | TYPE OF MAP | DISPLAY ATTRIBUTES |
|---|---|---|---|---|
| 50 | SHORE LINE | (1/50000) (1/500) | TOP. | DPA 00201 |
| 50 | RIVERS | (1/50000) (1/25000) | TOP. | DPA 00201 |
| 50 | 1ST CLASS ROAD | (1/50000) (1/10000) | TOP. | DPA 00002 |
| 30 | 2ND CLASS ROAD | (1/50000) (1/25000) | TOP. | DPA 00005 |
| 10 | ROAD BOUNDARY | (1/2500) (1/500) | TOP. FAC. | DPA 00001 |
| 50 | MAJOR BUILDING | (1/50000) (1/500) | TOP. FAC. | DPA 00140 |
| 250 | PREF. BOUNDARIES | (1/250000) (1/500) | TOP. | DPA 00010 |
| 250 | CITY BOUNDARIES | (1/250000) (1/500) | TOP. | DPA 00011 |
| 25 | TOWN BOUNDARIES | (1/2500) (1/500) | TOP. | DPA 00012 |
| 10 | WATER STEM LINE | (1/10000) (1/500) | FAC. | DPA 00021 |
| 2 | NO.2 WATER STEM LINE | (1/2500) (1/250) | FAC. | DPA 00021 |
| 2 | 1ST CLASS POWER SYSTEM | (1/2500) (1/250) | FAC. | DPA 00034 |
| 250 | ADMINISTRATIVE SECTION | (1/250000) (1/500) | TOP. | DPA 10410 |
| 10 | GOV. OFFICE NO.4 | (1/2500) (1/500) | TOP. | DPA 00141 |

FIG. 20

| SUBJECT COMPONENT MANAGING TABLE | | | |
|---|---|---|---|
| SUBJECT | GEOMETRICAL ENTITY LABEL | NAME ENTITY LABEL | ATTRIBUTES OF SUBJECT |
| SHORE LINE | GEN0010021 | — | SAT0020045 |
| ROAD BOUNDARY | GEN0002015 | — | SAT0001071 |
| 1ST CLASS ROAD | GEN0050117 | — | SAT0050115 |
| GOV. BUILDING NO. 4 | GEN1000176 | NEN0102584 | SAT1740011 |

FIG. 21

| TABLE OF DISPLAY ATTRIBUTES | | | | | |
|---|---|---|---|---|---|
| DISPLAY ATTRIBUTES | COLOR | LINE | LINE WIDTH | FACE TEXTURE | DISPLAY COMMAND |
| DPA00201 | L. BLUE | SOLID | 1 | — | OVR |
| DPA00202 | L. BLUE | SOLID | 2 | — | OVR |
| DPA00141 | GREEN | — | — | HATCHING | UND |

FIG. 22

| GEOMETRICAL ENTITY TABLE | | |
|---|---|---|
| GEOMETRICAL ENTITY LABEL | COMPONENT LABEL | TYPE |
| GEN 1000176 | FC0000102 | FACE |
| GEN 0010021 | LN0010111 | LINE |

11

| FACE TABLE | | |
|---|---|---|
| FACE # | LINE # | L-ORDER # |
| FC0000102 | LN 001172 | 0 |
| FC0000102 | LN 001173 | 1 |

12

| LINE TABLE | | |
|---|---|---|
| LINE # | POINT # | P-ORDER # |
| LN 001172 | PN00100273 | 0 |
| LN 001172 | PN 00100245 | 1 |

13

| POINT TABLE | | |
|---|---|---|
| POINT # | X # | Y # |
| PN 00100273 | 3076 | 2040 |
| PN 00100245 | 3070 | 1050 |

14

| PAGE OFFSET MANAGING TABLE | | |
|---|---|---|
| PAGE | APEXES OF PAGE BOUNDARY POLYGON | COMPENSATION FOR OFF-SET |
| P01 | $((X_{011},Y_{011})\cdots(X_{01k},Y_{01k}))$ | $(X_{F01}, Y_{F01})$ |
| P02 | $((X_{021},Y_{021})\cdots(X_{02\ell},Y_{02\ell}))$ | $(X_{F02}, Y_{F02})$ |
| P03 | . . | $(X_{F03}, Y_{F03})$ |
| P04 | . . | $(X_{F04}, Y_{F04})$ |

| FACE TABLE | | | |
|---|---|---|---|
| FACE | LINE | L-ORDER | DIRECTION |
| FC 0101 | LN 01030 | 0 | 0 |
| FC 0101 | LN 0104 | 1 | 0 |
| FC 0201 | LN 02030 | 0 | 0 |
| FC 0201 | LN 0204 | 1 | 0 |
| FC 0301 | LN 0301 | 0 | 0 |
| FC 0301 | LN 03020 | 1 | 0 |
| FC 0401 | LN 0403 | 0 | 0 |
| FC 0401 | LN 04040 | 1 | 0 |

FIG. 26c

| LINE-TABLE | | |
|---|---|---|
| LINE | POINT | P-ORDER |
| LN0101 | PN0101 | 0 |
| LN0101 | PN0102 | 1 |
| LN0102 | PN0103 | 0 |
| LN0102 | PN0104 | 1 |
| LN01030 | PN0107 | 0 |
| LN01030 | PN0106 | 1 |
| LN01030 | PN0105 | 2 |
| LN0104 | PN0105 | 0 |
| LN0104 | PN0110 | 1 |
| LN0104 | PN0107 | 2 |
| LN0201 | PN0201 | 0 |
| LN0201 | PN0202 | 1 |
| LN0202 | PN0203 | 0 |
| LN0202 | PN0204 | 1 |
| LN02030 | PN0206 | 0 |
| LN02030 | PN0205 | 1 |

FIG. 26d

| POINT-TABLE | | |
|---|---|---|
| POINT | x | Y |
| PN0101 | 850 | 850 |
| PN0102 | 600 | 1000 |
| PN0103 | 850 | 770 |
| PN0104 | — | — |
| PN0105 | — | — |
| PN0106 | — | — |
| PN0107 | — | — |
| PN0108 | — | — |
| PN01117 | — | — |
| PN0201 | 1500 | 500 |
| PN0202 | 850 | 850 |

| FACE-TABLE | | | |
|---|---|---|---|
| FACE | LINE | L-ORDER | DIRECTION |
| FC 001 | LN 003 | 0 | 0 |

FIG. 27c

| LINE-TABLE | | |
|---|---|---|
| LINE | POINT | P-ORDER |
| LN001 | PN0102 | 0 |
| LN001 | PN0401 | 1 |
| LN002 | PN0104 | 0 |
| LN002 | PN0403 | 1 |
| LN003 | PN0106 | 0 |
| LN003 | PN0105 | 1 |
| LN003 | PN0406 | 2 |
| LN003 | PN0407 | 3 |
| LN003 | PN0302 | 4 |
| LN003 | PN0106 | 5 |

FIG. 27d

| POINT-TABLE | | |
|---|---|---|
| POINT | $x$ | Y |
| PN0102 | 600 | 1000 |
| PN0104 | 450 | 1000 |
| PN0106 | 750 | 750 |
| PN0107 | 540 | 750 |
| PN0302 | 550 | 250 |
| PN0401 | 1700 | 400 |
| PN0403 | 1500 | 500 |
| PN0406 | 1260 | 450 |
| PN0407 | 1260 | 250 |

FIG. 29b1

| LINE-TABLE | | |
|---|---|---|
| LINE | POINT | P-ORDER |
| LN01 | PN01 | 0 |
|  | PN02 | 1 |
|  | PN03 | 2 |
|  | PN04 | 3 |
|  | PN05 | 4 |
| LN01 | PN01 | 5 |

FIG. 29b2

| LINE | | |
|---|---|---|
| LINE | POINT | P-ORDER |
| LN01 | PN01 | 0 |
| | PN02 | 1 |
| | PN02 | 0 |
| | PN06 | 1 |
| | PN06 | 0 |
| | PN03 | 1 |
| | PN04 | 2 |
| | PN07 | 3 |
| | PN07 | 0 |
| | PN05 | 1 |
| | PN08 | 2 |
| | PN08 | 0 |
| LN01 | PN01 | 1 |

FIG. 29b3

| LINE-TABLE-01 | | |
|---|---|---|
| LINE | POINT | P-ORDER |
| LN101 | PN08 | 0 |
| LN101 | PN01 | 1 |
| LN101 | PN02 | 2 |

| LINE-TABLE-02 | | |
|---|---|---|
| LINE | POINT | P-ORDER |
| LN201 | PN02 | 0 |
| LN201 | PN06 | 1 |

| LINE-TABLE-03 | | |
|---|---|---|
| LINE | POINT | P-ORDER |
| LN301 | PN06 | 0 |
| LN301 | PN03 | 1 |
| LN301 | PN04 | 2 |
| LN301 | PN07 | 3 |

| LINE-TABLE-04 | | |
|---|---|---|
| LINE | POINT | P-ORDER |
| LN401 | PN07 | 0 |
| LN401 | PN05 | 1 |
| LN401 | PN08 | 2 |

FIG. 30a

| FACE-TABLE | | |
|---|---|---|
| FACE | LINE | L-ORDER |
| FC01 | LN01 | 0 |

FIG. 30b1

| LINE-TABLE-01 | | |
|---|---|---|
| LINE | POINT | P-ORDER |
| LN102 | PN02 | 0 |
| LN102 | 0 | 1 |
| LN102 | PN08 | 2 |

FIG. 30b2

| LINE-TABLE-02 | | |
|---|---|---|
| LINE | POINT | P-ORDER |
| LN202 | PN06 | 0 |
| LN202 | 0 | 1 |
| LN202 | PN02 | 2 |

FIG. 30b3

| LINE-TABLE-03 | | |
|---|---|---|
| LINE | POINT | P-ORDER |
| LN302 | PN08 | 0 |
| LN302 | 0 | 1 |
| LN302 | PN07 | 2 |

FIG. 30b4

| LINE-TABLE-04 | | |
|---|---|---|
| LINE | POINT | P-ORDER |
| LN402 | PN07 | 0 |
| LN402 | 0 | 1 |
| LN402 | PN06 | 2 |

FIG. 31a 1

| FACE-TABLE-01 | | |
|---|---|---|
| FACE | LINE | L-ORDER |
| FC101 | LN101 | 0 |
| FC101 | LN102 | 1 |

FIG. 31a 2

| FACE-TABLE-02 | | |
|---|---|---|
| FACE | LINE | L-RDER |
| FC201 | LN201 | 0 |
| FC202 | LN202 | 1 |

FIG. 31a 3

| FACE-TABLE-03 | | |
|---|---|---|
| FACE | LINE | L-ORDER |
| FC301 | LN301 | 0 |
| FC302 | LN302 | 1 |

FIG. 31a 4

| FACE-TABLE-04 | | |
|---|---|---|
| FACE | LINE | L-ORDER |
| FC401 | LN401 | 0 |
| FC402 | LN402 | 1 |

GRAPHIC DATA PROCESSING METHOD AND SYSTEM

BACKGROUND OF THE INVENTION

Field of the Invention

The present invention generally relates to graphic data processing. More particularly, the invention concerns an improvement on or relating to a method and system for processing wide varieties of graphic or pattern data which are divided into pages.

Description of the Prior Art

As a method of preparing a data base of map data which cover intrinsically extensive space, it has heretofore been known to divide the map data into pages for storage and management. This known system is advantageous in that only the data regions required for retrieval, display, edition or the like may be extracted and loaded into a memory of a computer system.

Also, reading of broken lines or superposed lines has been proposed in U.S. Pat. Nos. 4,428,077 and 4,550,434.

However, no proposal has been made for a system which is capable of executing various functions such as retrieval, display, editing and the like on the graphic or map data stored over and across a large number of pages without regard to the page boundaries.

SUMMARY OF THE INVENTION

An object of the present invention is to provide a graphic data processing system which is capable of utilizing, preparing and editing map and/or drawing data stored among a large number of pages in the divided state.

BRIEF DESCRIPTION OF THE DRAWINGS

FIGS. 3a1 to 3a4 are views illustrating pages of a map, FIGS. 3b1 to 3b4 show face tables, FIGS. 3c1 to 3c4 show line tables, and FIGS. 3d1 to 3d4 show point tables, which data tables are stored in a file equipment;

FIG. 4 is a view showing a table of data for establishing correspondences between pages and a standard or reference coordinate system;

FIG. 8 is a view showing a management table for indicating varieties and availability of data concerning various subject matters, scales and others;

FIG. 9 is a view showing a page shape or geometry storage table in which page identification numbers are listed together with coordinate values defining the page geometry or shape;

FIG. 10 is a view showing a display mark management table indicating contents or instructions, display textures and display colors of designating marks;

FIG. 13 is a view similar to FIGS. 7a to 7c for illustrating a procedure for transferring map data from a file equipment to a temporary memory shown in FIG. 2a;

FIG. 17 is a view showing a data table which can be consulted for controlling the order of display according to which map data are displayed;

FIGS. 20 and 21 are views showing a subject component management table and a display attributes table consulted in executing the display procedure illustrated in FIG. 18;

FIG. 22 is a view for illustrating the order in which data are retrieved in executing the display procedure;

FIGS. 26a, 26b, 26c and 26d are views for illustrating a procedure for interconnecting four pages to constitute a single drawing together with associated data;

FIGS. 27a to 27d are views for illustrating an integrated drawing resulting from the page-connecting procedure together with relevant graphic data;

FIGS. 29a, 29b1 to 29b3 are views for illustrating procedure of re-division of an edited drawing into four pages together with associated data tables;

FIGS. 30a, 30b1 to 30b4 are views showing graphic data table employed in the re-division procedure; and FIG. 31a1 to 31a4 are views showing face data table for the pages resulting from the re-division procedure.

DESCRIPTION OF THE PREFERRED EMBODIMENTS

In the following, exemplary embodiments of the invention will be described by referring to the accompanying drawings.

Figure 2A:
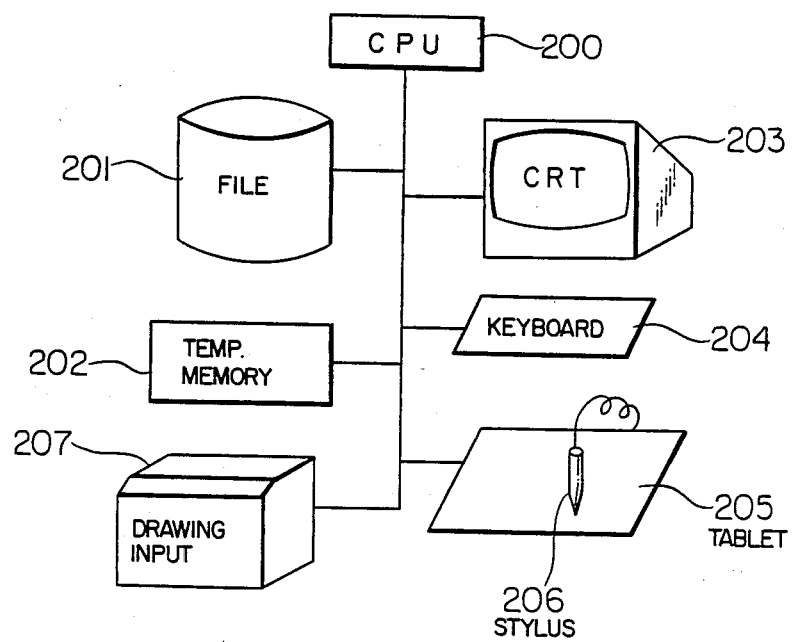
FIG. 2a is a schematic block diagram showing a general arrangement of a system for processing map data.

A system structure for executing various processes is illustrated in FIG. 2a. In the figure, a reference numeral 200 denotes a central processing unit or CPU, a numeral 201 denotes a file equipment for storing drawing or map data as well as graphic (or pattern) and character data which are divided into pages and classified in dependence on characteristic features of the map data such as reduced scale, varieties of subject matters and the like thereof, a numeral 202 denotes a temporary memory for allowing executing of processings such as edition or the like to the map or drawing data, a numeral 203 denotes a CRT (cathode ray tube) display for displaying drawing or map data as well as the other data, a numeral 204 denotes a keyboard, numerals 205 and 206 denote, respectively, a tablet and a stylus for designating locations subjected to editing, and a numeral 207 denotes a drawing data input device for fetching the drawing or map data in terms of image data for vector analysis to derive coordinate data. For more particulars of the system shown in FIG. 2a, reference is made to an article entitled "Automatic Recognition of Design Drawings and Maps" by Ejiri et al, IEEE 7th International Conference on Pattern Recognition (1984) Montreal Canada (p.p. 1296–1305). Reading and editing drawing data are also proposed by Shimada et al in U.S. Pat. No. 4,428,077 and U.S. Pat. No. 4,550,434, which are hereby incorporated by reference. Procedures as well as operations described below are performed with the aid of the system outlined above.

Figure 2B:
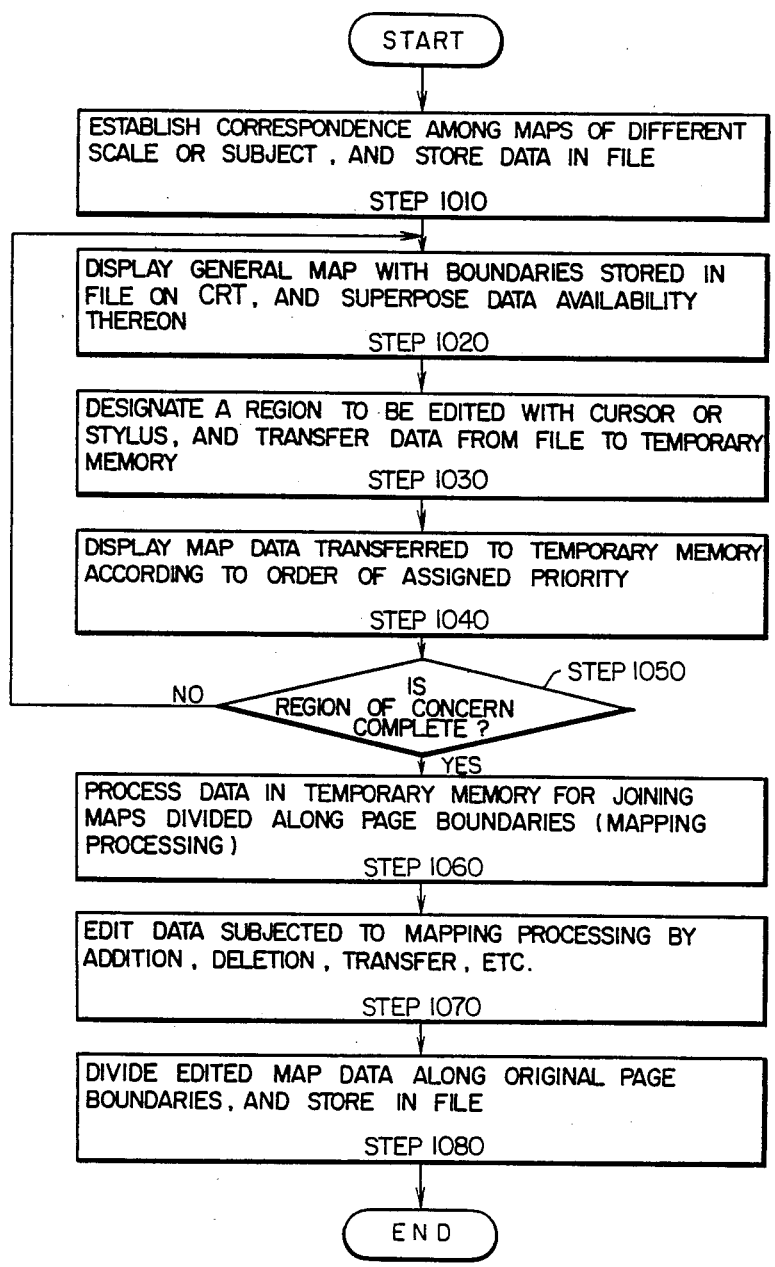
FIG. 2b is a flow chart for illustrating briefly a whole procedure of edition according to an embodiment of the invention.

Before entering into detailed description, the basic concept of the invention will be first outlined by referring to a flow chart shown in FIG. 2b. It is known that one and the same district may have a number of maps which differ from one another in respect to the scale, the subject matter (e.g. geomorphological map, piping diagram, power transmission and utilization system diagram, etc.) and others. Accordingly, in order to store the map data in a file equipment in correlated state, alignment of coordinate systems, determination of offset values relative to a reference coordinate system, establishment of correspondences among various parameters and the like processings are first performed (step 1010). Next, it is checked whether data for a region which is subjected to editing is available or not. To this end, a general map covering the region of concern is displayed on a CRT, which is followed by superposed display of marks indicative of data availability at a designated scale and subject matter (step 1020). A portion in the region for which desired data is found available and which is to be extracted for editing is indicated by using a tablet and a stylus, whereby data for that portion is extracted from the file equipment and transferred to a temporary memory (step 1030). The content of the temporary memory is displayed on the CRT to determine whether the data extracted from the file is relevant to the portion subjected to the editing. To this end, data elements are assigned with priority values and the elements are displayed in the order of high to low priority levels (step 1040). The series of processing steps described above is repeated until the display coincide with the contents requested for editing (step 1050). Since the data base transferred to the temporary memory is divided along the page boundaries, joining processing is executed to make linear portions continuous (step 1060). Then, processing for editing such as addition, deletion, displacement and the like are performed on the continuously joined data (step 1070). After the editing processes have been completed, the data present in the temporary memory is again divided along the page boundaries to be stored in the file equipment (step 1080).

Figure 1:
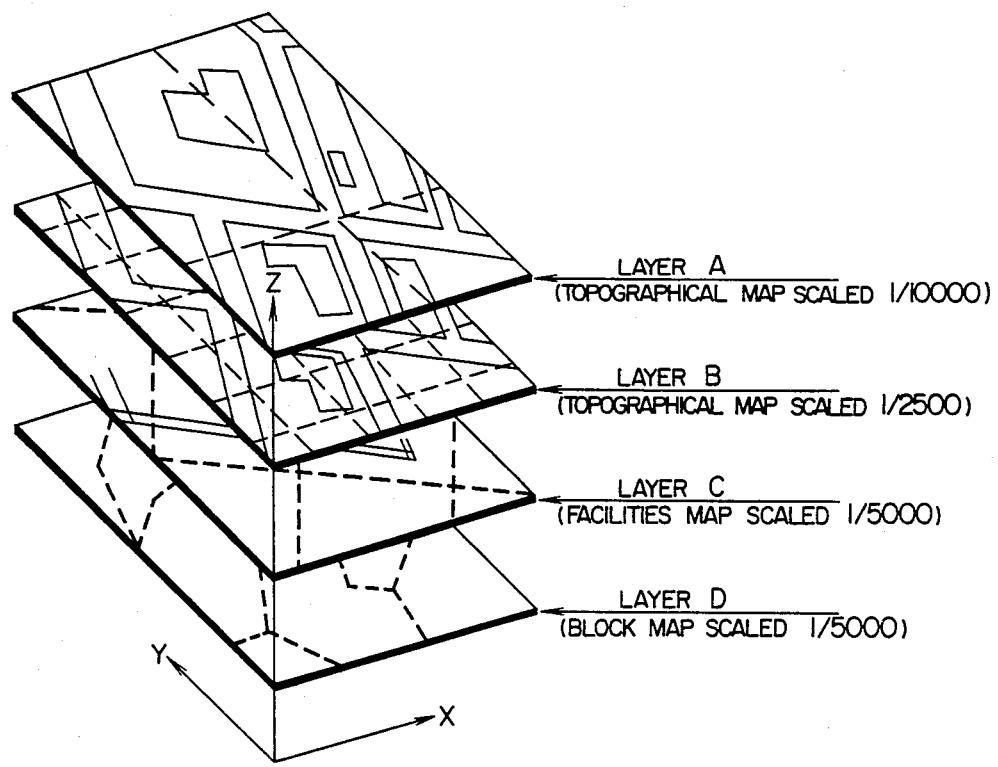
FIG. 1 is an exploded perspective view illustrating pictorically a structure of a data base in which a plurality of map data having different characteristics are stored and divided into pages.

Now, referring to FIG. 1, description will be made on a data structure in which drawing or map data can be stored on the page basis (i.e. data are divided into pages to be stored). FIG. 1 shows conceptionally an interpage relationship in the case where each of drawings differing one another in respect to the reduction scale, map components or the like are divided into parts referred to as page for the purpose of facilitating data management. In the figure, x and y represent coordinate axes for indicating a two dimensional extent of a drawing or map. It will further be noted that the map is classified into a plurality of component map layers A, B, C and D in dependence on the subject matters and other factors. By way of example, the map layer A corresponds to a topographical or geomorphological map of a reduced scale of 1/10000, the layer B corresponds to the topographical map the reduced scale of which is 1/2500, the layer C corresponds to a map showing institutes, facilities and the like (hereinafter referred to as the facilities map), and the layer D corresponds to a partition map showing a block, section, boundaries or the like. The component maps are separately arrayed along the Z-axis. In conjunction with the map data structure shown in FIG. 1, a map reference position varies in dependence on the layers even in the case of the topographical maps concerning an identical region or district if the scales thereof differs from each other, as is the case with the map layers A and B. As a consequence, the page boundaries of one topographical map (e.g. map layer A) does not always coincide with those of another component map (e.g. map layer B) even when the ratio of scales between both of the maps A and B can be represented by an integer. Further, when the contents of a component map differ from those of others (as is the case with the facilities map C with respect to maps A and B), the page boundaries thereof do not always extend in parallel with those of other maps, since the map C is provided with a coordinate system dedicated thereto for the purpose of facilitating the facilities data management, which coordinate system differs from those of the map layers A and B. Besides, the page boundary profile do not necessarily assume a rectangular form but may take an irregular polygonal form, as is the case of the map layer D.

The graphic or map data in each page is stored in a manner mentioned below.

Figures 3A, 3B, 3C, 3D:
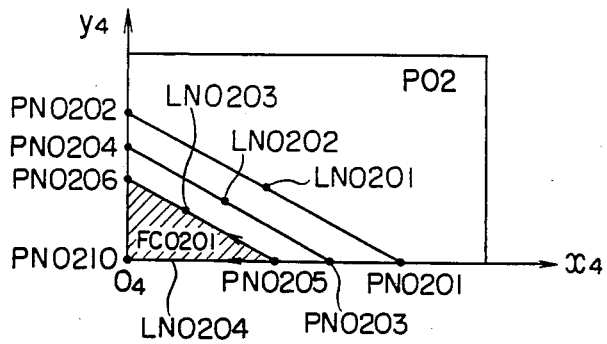

The map data for every page which are illustrated in FIGS. 3a1, 3a2, 3a3 and 3a4 are transformed through the map data input device 207 shown in FIG. 2a or through manipulation of the stylus 206 relative to the tablet 205 into face tables as shown in FIGS. 3b1, 3b2, 3b3 and 3b4, line tables as shown in FIGS. 3c1, 3c2, 3c3 and 3c4 and point tables as shown in FIGS. 3d1, 3d2, 3d3 and 3d4 with the aid of the coordinate systems ($x_1$, $O_1$, $y_1$), ($x_2$, $O_2$, $y_2$), ($x_3$, $O_3$, $y_3$) and ($x_4$, $O_4$, $y_4$) dedicated to the maps, as illustrated in FIGS. 3a1, 3a2, 3a3 and 3a4, respectively, wherein $O_1$, $O_2$, $O_3$ and $O_4$ represent the origins, respectively. The resulting various tables are then stored in the file equipment 201. By way of example, let's consider the drawing or map on a page P01 (FIG. 3a1). It will be seen that the drawing includes two line elements LN0101 and LN0102 and a single area or face element FC0101. It will further be seen from the face table of FIG. 3b1, "FACE-TABLE-01", that the face FC0101 is defined by a pair of lines LN0103 and LN0104. In conjunction with the contents of the face table "FACE-TABLE-01", it should be mentioned that data listed in the column L-ORDER give the order or sequence to the lines defining the face, while data "DIRECTION" represents an index designating the direction of line so that the face can be defined by following the lines clockwise. More specifically, when the index assumes a value "0", P-ORDER in the line table of FIG. 3c1 follows the points in the order of small to large values. On the other hand, when the index is "1", the P-ORDER in the line table of FIG. 3c1 follows the points in the order of large to small values. The line table of FIG. 3c1, "LINE-TABLE 01", defines relations between the points "POINT" constituting each line and the values P-ORDER which impart the order of sequence to the corresponding points in defining a line. Finally, the point table of FIG. 3d1, "POINT-TABLE-01", correlate the points "POINT" with the positional coordinates (X, Y). It should be noted that the values of X and Y in the point table "POINT-TABLE-01" are determined with reference to the coordinate system (x, 0, y) independent of those of the other pages P02, P03 and P04.

With a view to systematically managing the various page boundaries and coordinate systems, there is prepared a table representing correspondences between the page boundaries and the coordinate systems, respectively, as is illustrated in FIG. 4. More specifically, the table of FIG. 4 lists up relations among the coordinate series defining the page boundary polygons with reference to a standard coordinate system, relative rotational angles (also referred to as relative rotations) between the coordinate axes of the individual pages and those of the standard or reference coordinate system, and the reference positions of the individual pages in association with the respective page labels.

For preparing the table shown in FIG. 4, the series of coordinates of the page boundary polygons can be determined by inputting a drawing indicating the shape or configuration of the page boundary (also referred to as page profile) through the drawing input device 207 or by following sequentially boundaries of a page boundary map placed on the tablet 205 with the stylus 206. On the other hand, the relative rotational angle of each page coordinate system and the value for correcting the offset of the reference position on each page relative to the standard coordinate system can be obtained by displaying on the CRT 203 the axes of the page coordinate system, positioning the stylus at the page reference position and then moving the stylus on the page coordinate axes, wherein the coordinate value requested to be inputted is supplied to the CPU 200 through the keyboard 204 to read the position of the stylus at that instant. This procedure is repeated a number of times corresponding to that of pages to be managed. The resulting data are associated with the corresponding page labels, respectively, to be subsequently stored in the file equipment 201 in the table format shown in FIG. 4.

Next, description will be made on a method of establishing correspondences between the pages having boundaries and the coordinate systems differing from each other with the aid of the table as shown in FIG. 4. For convenience of description, let's consider a drawing or map illustrated in FIG. 5. Assuming that correspondences are to be established between the page boundaries P01, P02, . . . , P12 indicated by solid lines in the map on one hand and page boundaries VP01, VP02, . . . , VP12 indicated by dotted broken lines, respectively. It is further assumed that the polygons representative of the page boundaries are classified into groups in dependence on the types of the respective maps as indicated by groups a and b in the table shown in FIG. 4 and stored in a page shape storing table. On these assumptions, consideration will then be made on establishing correspondence to the hatched rectangular page VP06 shown in FIG. 5. It will be seen that the page boundaries P02, P04, P05 and P07 lie in partially overlapping or superposing relation with the page VP06. At this point, a procedure for examining the interpage overlapping relation will be described. The procedure starts from the fact that each side of a polygon defining a boundary of a page can be defined by the positions of adjacent apexes in two-coordinate system and the overlapping relation can be examined by finding whether the sides of the polygons to be checked as to the partially overlapping relation intersect each other or not. By way of example, the overlapping relation between the pages VP06 and P05 can be ascertained by examining the overlapping relation between the polygon ($R_1$, $R_2$, $R_3$, $R_4$) defining the page VP06 and the polygon ($V_1$, $V_2$ . . . , $V_{10}$) defining the page P05. To this end, among all the possible combinations of individual sides $\overline{R_iR_j}$ (i, j=1-4) and $\overline{V_mV_n}$ (m, n=1-10) of both the polygons having the sides ($\overline{R_1R_2}$, $\overline{R_2R_3}$, . . . , $\overline{R_4R_1}$ and ($\overline{V_1V_2}$, $\overline{V_2V_3}$, . . . , $\overline{V_1V_{10}}$), respectively, the intersecting relation between both sides $\overline{R_iR_j}$ and $\overline{V_mV_n}$ can be determined through a procedure illustrated in a flow chart of FIG. 6. Referring to this figure, at a step 100, a flag CF indicating possibility of intersection is initialized to "0"(CF=0), being followed by a step 101 where ranges of the coordinate values belonging to the sides are determined as follows:

($XR_{min}$, $XR_{max}$), ($YR_{min}$, $YR_{max}$) and $$(XV_{min}, XV_{max}), (YV_{min}, YV_{max}).$$

Then, at step 102, it is examined whether $XR_{min}$ or $XR_{max}$ is located within the range ($XV_{min}$, $XV_{max}$), or whether $YR_{min}$ or $YR_{max}$ lies within the range ($YV_{min}$, $YV_{max}$), and also is examined whether $XV_{min}$ or $XV_{max}$ is located within the range ($XR_{min}$, $XR_{max}$) or whether $YV_{min}$ or $YV_{max}$ lies within the range ($YR_{min}$, $YR_{max}$). When the above condition is satisfied, the possibility flag CF is set to "1"(step 102). Here, the range includes the end points. In that case, the coordinates of the cross point or intersection between straight lines $\overline{R_iR_j}$ and $\overline{V_mV_n}$ are determined as ($X_c$, $Y_c$) through steps 103 to 105. Furthermore, when and only when the coordinate value of $X_c$ is located within the range defined by ($XV_{min}$, $XV_{max}$) and ($XR_{min}$, $XR_{max}$) and also the coordinate value of $Y_c$ is located within the range defined by ($YV_{min}$, $YV_{max}$) and ($YR_{min}$, $YR_{max}$), then an intersection flag is set. Otherwise non-intersection flag is set (steps 105–107). The pages enclosed in the overlapping pages may then be regarded as totally overlapping pages.

Figure 7A:
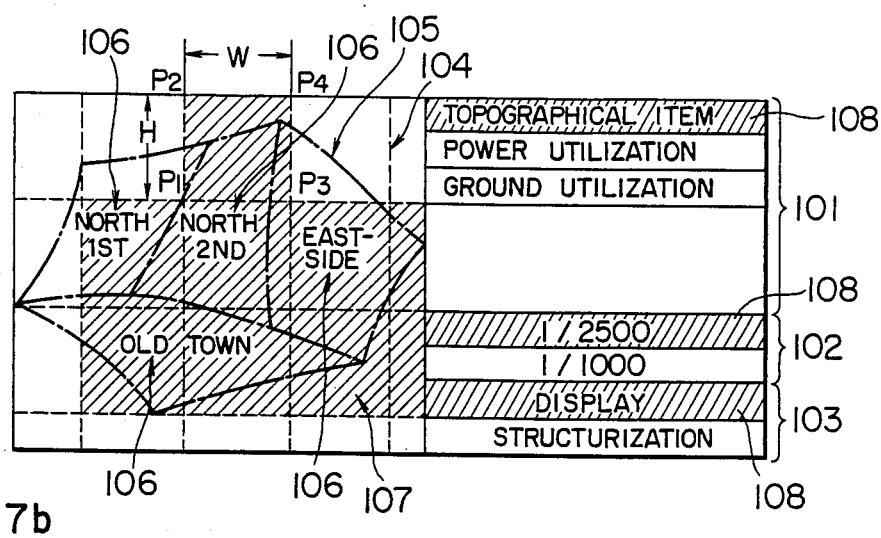
FIGS. 7a to 7c are views showing examples of map display indicating availability status of various map data.
Figure 7B:
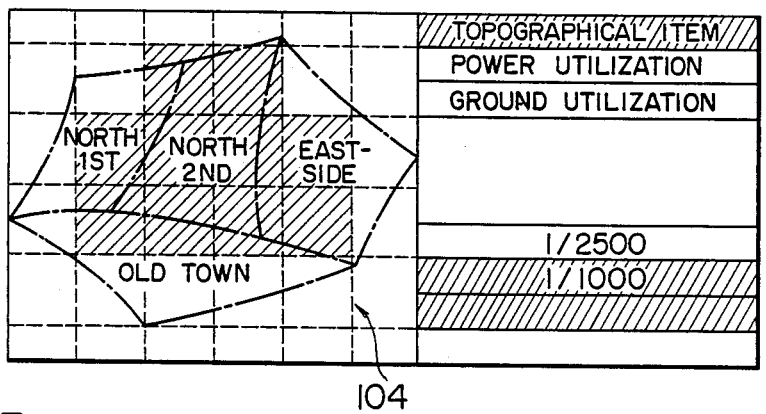
Figure 7C:
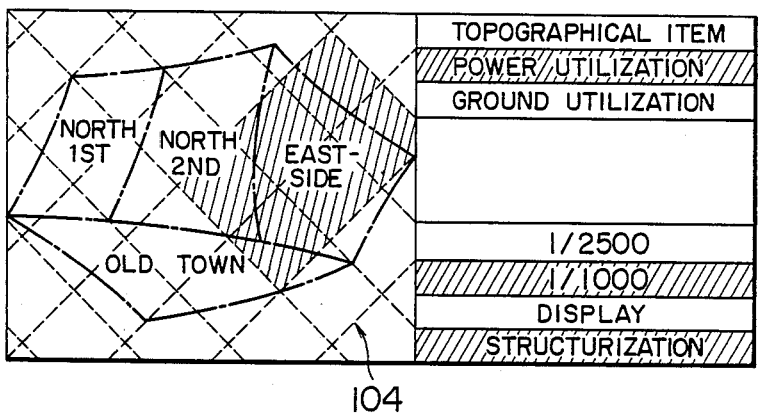

Next, description will be directed to a method of indicating definitely the data availability status to a plurality of system users starting from the data base management status described above so that the user can know to what extent the data is available. In general, the procedure resides in that a general map (also referred to as a frame map) covering the whole range subjected to management or supervision or edition is displayed on a CRT together with the page boundaries constituting the managing or supervising units of the data base, wherein a region which is designated and data of which is available is displayed in superposition with a predetermined mark. FIGS. 7a–7c illustrate examples of map frame structures for examining the availability status of a map data base of a city A. In the right hand column, there is listed a menu including items to be checked with regards to the desired matters of the map, while in the remaining space, a general view of the city A is schematically shown. Now, description will be made in more detail by referring to FIG. 7a. The righthand column is allocated to the menu. More specifically, rows 101 indicates varieties or types of subject matter of the map to be checked such as "Topographical Map", "Power Transmission Lines aod Utilization System Diagram" or the like. A row 102 indicates the scale of the map, and rows 103 indicate the type of examination to be made. On the other hand, the general view of the city A located on the lefthand side indicates that the city A covers North 1st quarter, North 2nd quarter, East quarter, and Old Town quarter and others. Broken lines 104 represent page boundaries when sub-areas or sub-regions are defined as pages in dependence on the subject matter or the scale. Dotted broken lines 105 represent the boundary of the city and the boundaries between the quarters or towns. Reference numeral 106 denote displays of geographical designations on the general view of the city A. A reference numeral 107 denotes a marker which indicates a range of the items which are designated by the user and for which data are available from the data base. The marker 107 is constituted by a hatched rectangle in the case of the illustrated example. Reference numerals 108 indicate markers for indicating the items in the menu as designated or requested. Each marker 108 is also constituted by a hatched rectangle. With the map frame structure described above, there is shown in FIG. 7a the range of available data with which the topographical map can be displayed at the reduced scale of 1/2500, wherein the range in concern is indicated on the map of the city A by the markers 106 (hatched areas). Similarly, in FIG. 7b, the markers 106 indicates the range of available data with which the topographical map can be displayed at the reduced scale of 1/1000. In order to indicate the page boundaries and the range which can be displayed at the designated or requested scale even for the identical topographical map, there is prepared a page list (TM25006, TM25007, ..., TM25027) which satisfies the conditions that the reduced scale is "1/2500", the subject matter is "topographical map" and that the content or sort of examination to be made is "display" on the basis of an available data management table shown in FIG. 8. Subsequently, a list of coordinate values corresponding to the page numbers, respectively, is prepared for each of the elements of the page list on the basis of a page shape storage table shown in FIG. 9. It should be mentioned that the table shown in FIG. 9 can be prepared through partial extraction of the data listed in the columns labelled "Page" and "Apexes of Page Boundary Polygon" n the table shown in FIG. 4. The inner space of a polygon defined by given coordinate values of apexes as shown in FIG. 9 is applied with a texture and a color selected from an indicating mark management table shown in FIG. 10 in dependence on the content of examination such as display. This procedure is repeated until the page list is exhausted. Turning to FIG. 7c, there is illustrated an example of display which indicates with the markers or hatched areas not only the possibility of displaying the power transmission and utilization system diagram at the reduced scale of 1/1000 but also the range in which structurization such as simulation of electric load distribution is made possible. For displaying the page boundaries of the power transmission and utilization system diagram and the mark indicating the possibility of display, a page list (EL10006, EL10007, ..., EL10011) which satisfies the conditions that the reduced scale is "1/1000", the subject matter is "Power Transmission and Utilization System Diagram" and that the content of examination is "Structurization" is prepared on the basis of the available data status management table shown in FIG. 8. Subsequently, a coordinate value list corresponding to each page number is prepared for each of the elements of the page list from the page configuration storage table shown in FIG. 9 and is applied with a texture and a color differing from those used in the topographical map display mode by consulating the table shown in FIG. 10. Accordingly, the page boundaries and the range for which the data base is available do not necessarily coincide with those of the topographical map displayed at the same scale. More specifically, in the case of the topographical map display, data is so managed that the north coincides with the top of the map. In contrast, in the case of the display of the power transmission system diagram, orientation of the map is often so determined that most of roads extend horizontally or vertically for facilitating observation. Consequently, when orientation is so selected that the north coincides with the top of the map, the page boundaries do not always run horizontally or vertically, as is illustrated in FIG. 7c.

Figure 11:
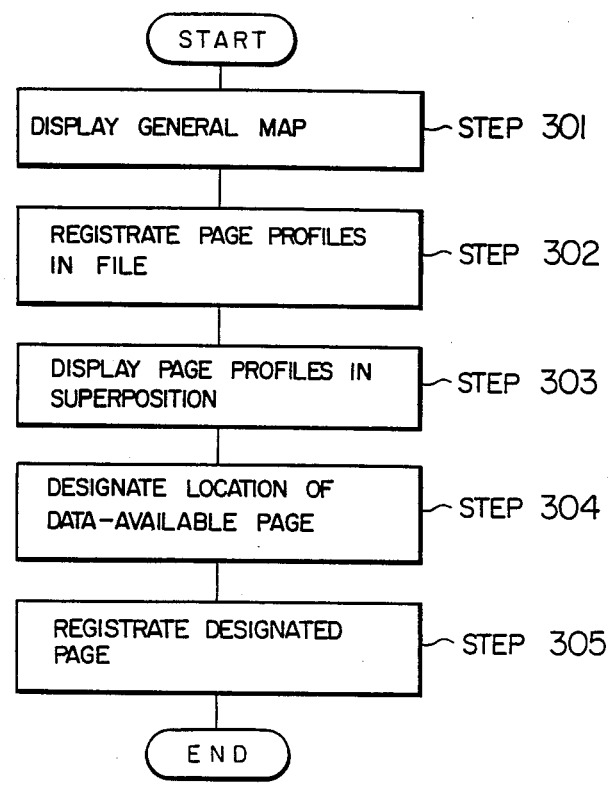
FIG. 11 is a view showing a flow chart illustrating a procedure for preparing the available data status management table shown in FIG. 8.
Figure 12:
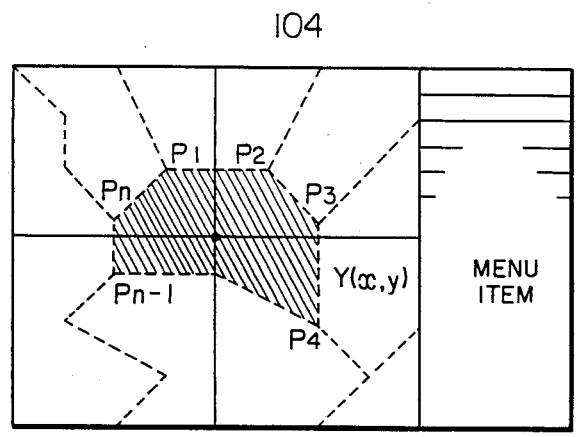
FIG. 12 is a view similar to FIGS. 7a to 7c except that the page boundary shape is of an irregular polygon.

Next, a procedure for preparing the available data status management table (FIG. 8) which is resorted to upon generation of displays illustrated in FIGS. 7a, 7b and 7c will be elucidated by referring to a flow chart shown in FIG. 11. At first, a general or framework map stored previously in the file equipment 201 is displayed on the CRT 203 at a step 301. A list of the coordinate values of apexes P1, P2, P3, P4, etc. which determine the configuration of the page boundaries such as those indicated by 104 in FIGS. 7a, 7b and 7c is prepared and registered in the file equipment 201 at a step 302. More specifically, in case the page boundary is represented by a simple or regular rectangle as indicated by the broken lines 104 in FIGS. 7a–7c, the width W and the height H of the rectangle are inputted with the aid of the keyboard 204 to thereby prepare the coordinate value list shown in FIG. 9 through integral multiplication and accumulation effected by the CPU 200. On the other hand, when the page boundary form is of an irregular polygon as indicated by broken lines 104 in FIG. 12, the drawing input device 207 is employed to prepare the list of coordinate values of the apexes defining the polygon, or alternatively the tablet 205 and the stylus 206 are made use of for inputting sequentially the positions of the apexes one by one to thereby prepare the list of the coordinate values for the inputted apexes. The list thus obtained is stored in the file equipment in the form of the page shape storing table shown in FIG. 9. At a next step 303, the page boundary determined at the step mentioned above is displayed on the CRT 203 in superposition to the general map displayed already. At that time, the menu including the items 101 to 103 as shown in FIGS. 7a–7c is displayed simultaneously for the preparation to the processing to be executed at the succeeding step 304 where the page list (FIG. 8) required for indicating the availability range of the map or drawing data stored in the file equipment on the page-by-page basis are contained. To this end, the sort and the coverage of the map inputted to the file equipment 201 from the drawing input device 207 shown in FIG. 2a are previously examined to prepare the page list independent of the inputted drawing data. In practice, however, it is difficult to previously examine or determine the sort and the coverage for all the drawings or maps. Accordingly, the page list may be prepared by designating the location of the concerned page in the general or framework map displayed on the CRT 203 by means of the tablet 205 and the stylus 206. By way of example, the menu displayed on the CRT 203 may be consulted to designate the reduction scale and the sort or variety of the drawing for which the drawing data are available, to thereby allow the page boundary polygon corresponding to the designated item to be displayed in superposition on the general map. When the page boundary polygon such as shown in FIG. 12 is displayed, the stylus 206 is moved to a given position within the displayed page to determine the corresponding coordinates V(X, Y), provided that the drawing data for the page defined by the apexes P1, P2, P3, ..., Pn are available. Subsequently, the coordinate value list stored in the page shape storage table shown in FIG. 9 is consulted to determine if the identification number of the page boundary polygon including the stylus position is present. This can be accomplished through simple geometrical operation for determining inclusion relation of a face and a point. Finally, at a step 305, the page number as determined is inserted in the page list of the available data status management table shown in FIG. 8. In this case, the page number is placed at the location coinciding with the reduced scale and the sort of the drawing selected from the menu at the aforementioned step 304. This procedure is repeated a number of times corresponding to that of sorts (varieties) of the maps to be inputted, wherein the resulting data are written in the rows of the available data management table in the form of the list.

Figure 13:
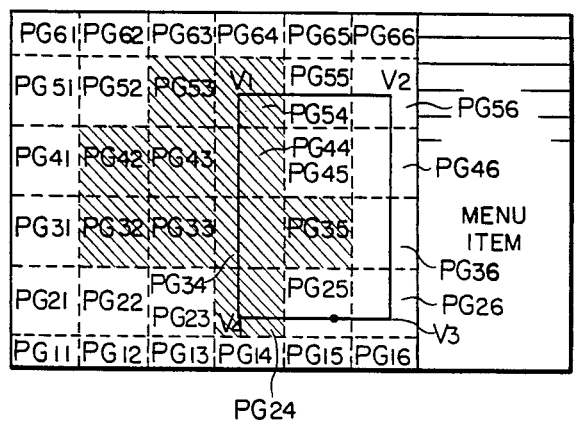

In order to retrieve the element which must satisfy various conditions from the map data stored in the file equipment 201 of the system shown in FIG. 2 at a high speed, the map data should preferably be loaded once in the temporary memory 202 shown in FIG. 2a from the standpoint of realizing an improved efficiency. At this point, description will be made on a method of loading map data from the data base stored in the file equipment 201 to the temporary memory 202. In this connection, as the method of designating the range of data to be loaded into the temporary memory 202 there can be mentioned two methods, i.e. a first method in which data area is designated on the page-by-page basis, and a second method in which data area is to be loaded is designated in terms of a polygon. According to the first method, the stylus shown in FIG. 1 is moved to a given position on a page to be loaded, and the page number of a polygon including the coordinate values of said position is determined by consulting the coordinate value list shown in FIG. 9, whereupon an instruction for transferring the data of the aforementioned page is issued. This procedure is repeated until all the data areas to be loaded are covered. On the other hand, execution of the second method encounters some difficulties. By way of example, it is assumed that a polygon defined by $V_1, V_2, V_3, V_4, V_1$ as illustrated in FIG. 13 is designated as the area whose data is to be transferred to the temporary memory 202. It will be seen that the polygon does not coincide with the page boundaries. Further, the data for the pages $PG_{24}, PG_{25}, PG_{26}, PG_{34}, PG_{35}, PG_{36}, PG_{44}, PG_{45}, PG_{46}, PG_{54}, PG_{55}$ and $PG_{56}$ which are associated with the polygonal areas subjected to the data transfer are not all available. More specifically, the pages $PG_{25}, PG_{26}, PG_{36}, PG_{45}, PG_{46}, PG_{55}$ and $PG_{56}$ which are not marked with the hatching are furnished with no available data concerning the items selected from the menu. In view of the area subjected to the data loading, the pages may be classified into four categories as follows:

(1) Page furnished with the available data and completely covered by the area or region subjected to the data loading, e.g. page $PG_{35}$.

(2) Page furnished with the available data partially covered by the area or region subjected to the data loading, e.g. pages $PG_{24}, PG_{34}, PG_{44}$ and $PG_{54}$.

(3) Page having no data and completely covered by the area or region subjected to the data loading, e.g. page $PG_{45}$.

(4) Page having no data and partially covered by the area subjected to the data loading, e.g. pages $PG_{55}, PG_{56}, PG_{46}, PG_{36}, PG_{26}$ and $PG_{25}$.

Under the circumstances, upon data loading to the temporary memory 202, all the data of the page belonging to the category (1) are transferred. In the case of the page belonging to the category (2), all data of the pages or data relevant to the space enclosed by the boundary of the area subjected to the loading and the page boundaries are transferred to the temporary memory. On the other hand, in the case of the pages belonging to the categories (3) and (4), it is examined whether the relevant map or drawing data are present for the pages which correspond to those belonging to the categories (3) and (4) and which are however, managed at different reduction scale. When the data are found to be available, they are transferred to the temporary memory.

Figure 14:
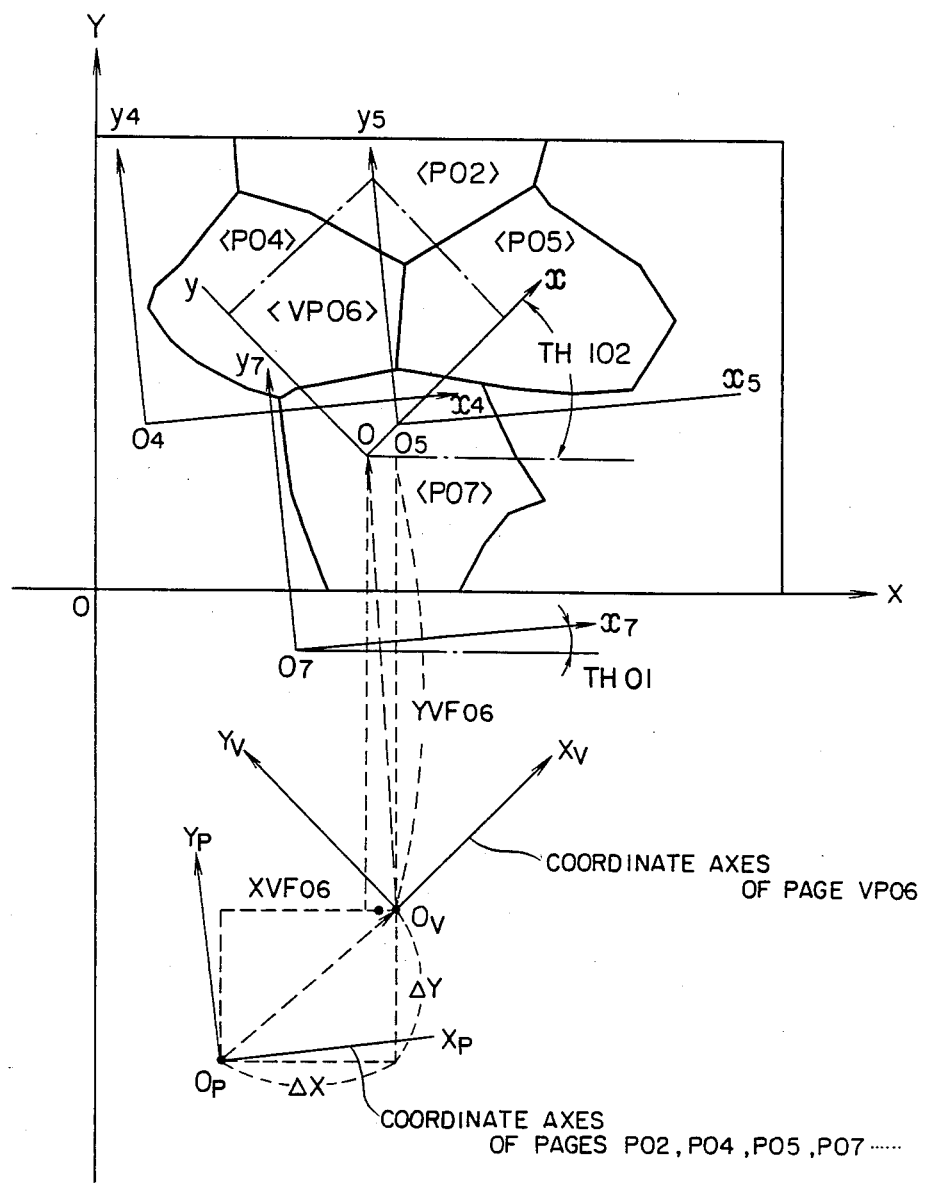
FIG. 14 is a schematic diagram for illustrating relation between two coordinate systems of overlapping pages.

Next, a procedure for extracting the desired data for the region or area subjected to the data transfer will be described by referring to FIG. 14 on the assumption that data elements are to be extracted from the region VP06 indicated by hatching in FIG. 5. To this end, the contents or coordinate data of all the pages related to the region VP06 are added with the coordinate offset correcting values shown in FIG. 4 so that a continuous coordinate system having no page boundaries is realized, and then the corrected data are transferred to the temporary memory 202 shown in FIG. 2. By way of example, let's consider the page P02. The contents (coordinates) of the page P02 are added with the offset correcting values $(XF_{02}, YF_{02})$ contained in the table shown in FIG. 4 to be translated into the coordinate values in the reference coordinate system $(X_p, O_p, Y_p)$ of the layer (see FIG. 1) to which the page P06 belongs, the translated coordinate values being then transferred to the temporary memory 202. On the other hand, when the page VP06 belongs to a different coordinate system $(X_v, O_v, V_v)$, there exist positional offsets or deviations in respect to the origin and the rotational angle between the coordinate systems $(X_v, O_v, Y_v)$ and $(X_p, O_p, Y_p)$. Accordingly, the offsets have to be compensated for. To this end, the offset value $\Delta X$ in the $X_p$-direction and the offset value $\Delta Y$ in the $Y_p$ direction of the coordinate system $(X_p, O_p, Y_p)$ are compensated for so that the origins $O_p$ and $O_v$ coincide with each other, whereby the coordinate system $(X_p, O_p, Y_p)$ is translated into a coordinate system $(X'_p, O'_p, Y'_p)$. Since the rotational angle between the coordinate system $(X'_p, O'_p, Y'_p)$ and $(X_v, O_v, Y_v)$ is given by $(TH02-TH01)$, the coordinate system $(X'_p, O'_p, Y'_p)$ is translated to the system $(X_v, O_v, Y_v)$ in accordance with the following expression:

$$\begin{bmatrix} X_v \\ Y_v \end{bmatrix} = \begin{bmatrix} \cos\theta & \sin\theta \\ -\sin\theta & \cos\theta \end{bmatrix} \begin{bmatrix} X_p \\ Y_p \end{bmatrix}$$

where $\theta = TH02 - TH01$.

Subsequently, the coordinate offset correcting values ($XVF_{01}$, $YVF_{06}$) are subtracted to determine the values belonging to the coordinate system (x, o, y) of the page VP06. In this way, the contents of all the pages (P02, P04, P05, P07) related to the page VP06 are completely translated to the values belonging to the coordinate system of the page VP06.

Figure 15:
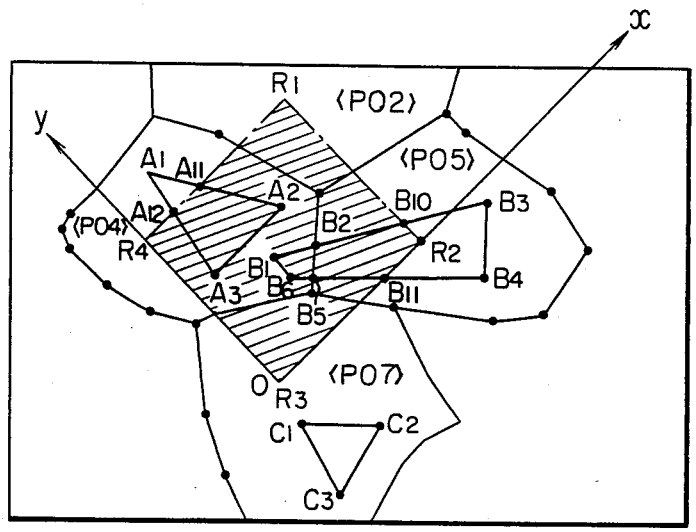
FIG. 15 is a view for illustrating a procedure for extracting only those data belonging to a designated or requested page.

At this stage, inter-page correspondence can be determined. In this connection, it is noted that four pages (P02, P04, P05 and P07) bear correspondence relation to the page VP06, resulting in that occupation of the temporary memory 202 is significantly increased. Consequently, a processing for extracting from these pages only the components that are contained in the page VP06 is executed. The basic feature of this processing is same as the method of examining the inter-page overlapping relation described hereinbefore by referring to the flow chart shown in FIG. 6. Accordingly, it will be sufficient at this point only to outline the procedure. Referring to FIG. 15, it is assumed that pages P02 to P07 associated with the page VP06 contain three graphic pattern components mentioned below:

A ($A_1$, $A_2$, $A_3$, $A_1$), B ($B_1$, $B_2$, $B_3$, $B_4$, $B_5$, $B_6$, $B_1$),

C ($C_1$, $C_2$, $C_3$, $C_1$)

Let's examine the overlapping relation with the page boundary polygon ($R_1$, $R_2$, $R_3$, $R_4$, $R_1$) of the page VP06. Since the graphic pattern C bears no overlapping relation to the polygon, this pattern C is deleted. On the other hand, the graphic patterns A and B are in partially overlapping relation with the polygon ($R_1$, $R_2$, $R_3$, $R_4$, $R_1$). Accordingly, the coordinates of intersections between the graphic patterns A and B and the page boundary polygon are determined. In this connection, it is noted that the graphic pattern A has a side $R_1 R_4$ which is intersected at an even number of points $A_{11}$ and $A_{12}$, while the graphic pattern B includes the sides $\overline{R_1R_2}$ and $\overline{R_2R_3}$ each having odd number of intersections typified by $B_{10}$ and $B_{11}$, respectively. In the former case, a new side is defined between the adjacent intersections to determine the graphic component ($A_{11}$, $A_2$, $A_3$, $A_{12}$, $A_{11}$) included in the page VP06. In the latter case, sides are defined between the apex $R_2$ of the page boundary polygon contained in the graphic pattern and the intersections $B_{10}$ and $B_{11}$, respectively, to determine a graphic pattern component ($B_1$, $B_2$, $B_{10}$, $R_2$, $B_{11}$, $B_5$, $B_6$, $B_1$) included in the page polygon VP06.

Figure 5:
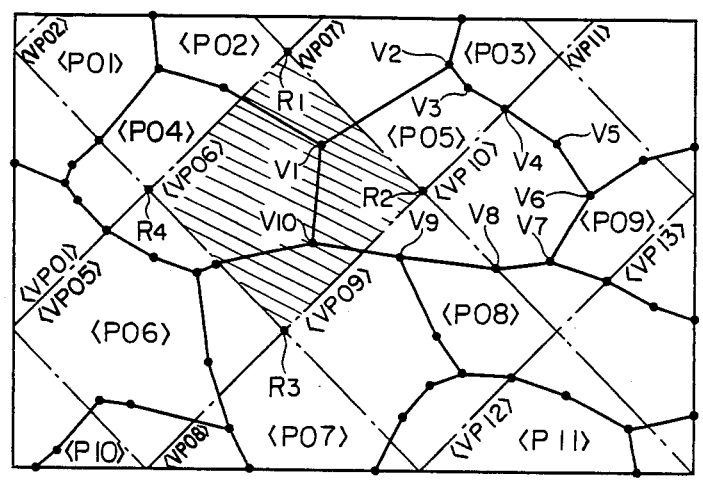
FIG. 5 is a view showing a map for illustrating a procedure for establishing correspondence between pages having different boundaries and coordinate systems.
Figure 6:
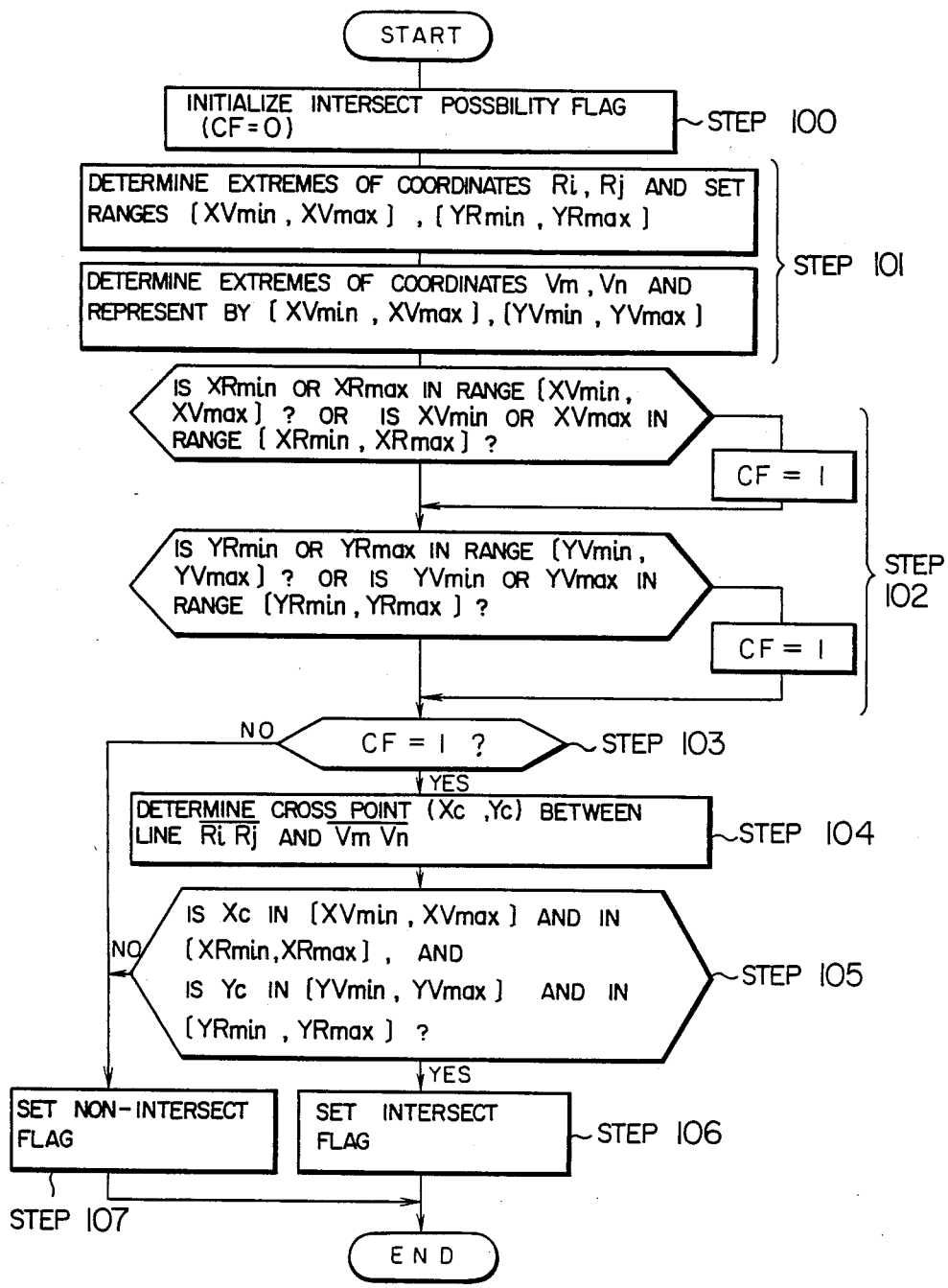
FIG. 6 is a flow chart illustrating the procedure for finding overlapping relation.

Through the processings mentioned above, the drawing having the page boundary indicated by solid lines in FIG. 5 can be put in proper correspondence relation with the drawing VP06 having the page boundary indicated by broken lines.

Figure 16:
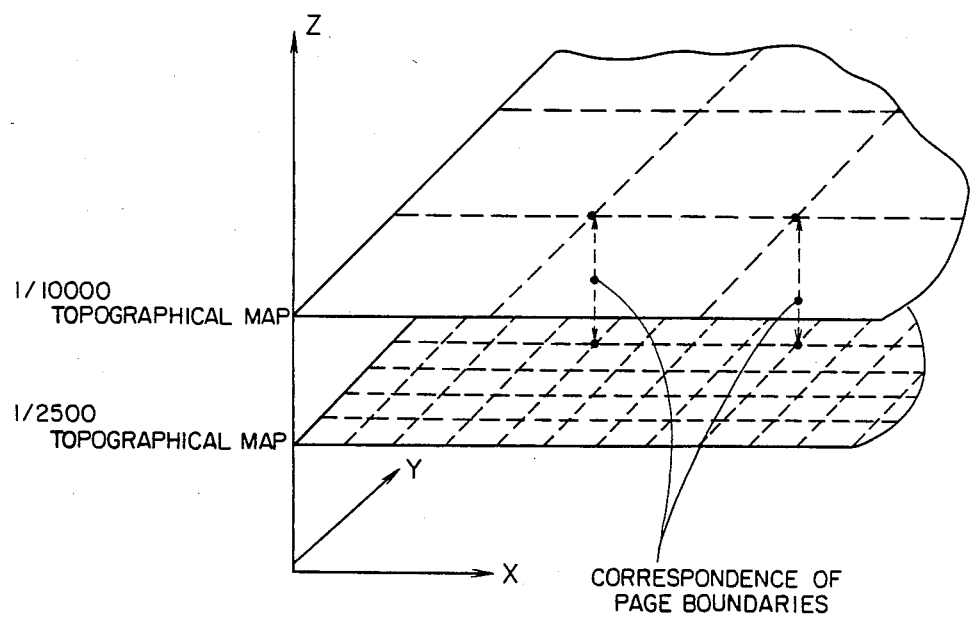
FIG. 16 is a view for illustrating correspondence between page boundaries between different topographical map layers.

At this point, it should be mentioned that upon occurrence of the request for establishing the correspondence relation mentioned above, there may arise such a case in which the factors such as the coordinate system, the page boundary and the like are already known. In such case, the processings mentioned above are applied to the drawing constituting one layer (FIG. 1) to thereby arithmetically determine correspondences to a plurality of page boundaries, wherein the resulting data are stored in the file equipment 201 shown in FIG. 2 so that they can be transferred to the temporary memory 202, as occasion requires. Further, when the topographical data are managed at different scales, the ratio between the scales should preferably be selected equal to an integer (e.g. when one scale is 1/10000, then other scale is selected to be 1/2500), while the reference coordinate systems of the different layers are standardized so that they coincide with each other, as is illustrated in FIG. 16, with a view to facilitating establishment of correspondence. Then, a topographical map having a given scale and a coordinate system can easily undergo the scale translation to the closest one of the standardized scales. Subsequently, the map is subjected to the processings described hereinbefore to thereby be translated to the standardized page which is then stored in the file equipment 201.

The pieces of data extracted from the data base as desired and stored in the temporary memory 202 are displayed on the CRT 203 before being edited. In that case, the data are not displayed in accordance with the order in which they have been loaded in the temporary memory 202 but assigned with priorities concerning the order or sequence in which the data are displayed so that only the components having the priorities proper to the display environment are displayed or the data are displayed in the order of high to low priorities so that the density of the components displayed on the CRT may remain within a predetermined range. By virtue of this procedure, the time required for the display can be reduced significantly. Besides, a problem that graphic components being displayed become too small in size after completion of the displaying procedure can be evaded.

Figure 18A:
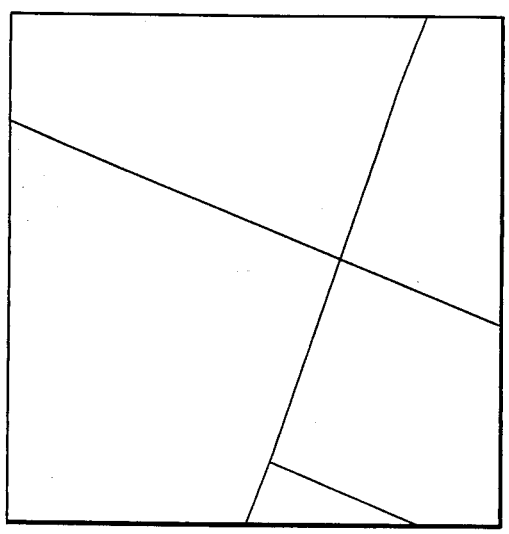
FIGS. 18a, 18b and 18c are views for illustrating a display procedure for generating display in an ordered manner.
Figure 18B:
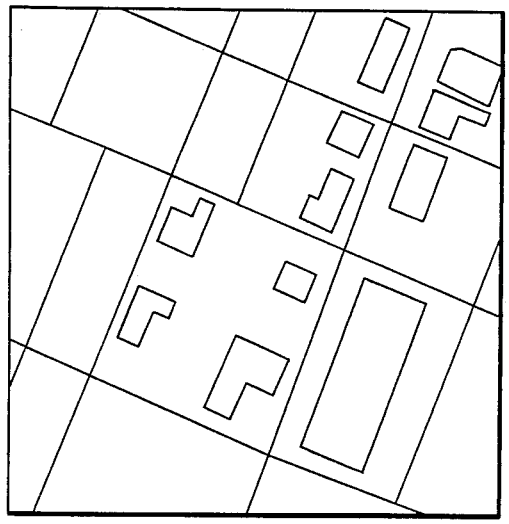
Figure 18C:

FIG. 17 shows, by way of example, a display priority control table required for controlling the order in which map or graphic data are displayed in case a topographical map or facilities map is to be displayed. When a request is issued for displaying a drawing of a designated reduction scale which is included in a designated region, the components of the drawing are displayed in the order determined by consulting the control table shown in FIG. 17. An example of this procedure will be described by referring to FIGS. 18a, 18b and 18c. It is assumed that a request is issued for displaying a part of a topographical map scaled at 1/2500. Among the graphic components included in the map, those having the highest priority such as "state or prefecture boundary", "city or town boundary", "administrative section identifying characters" and the like are first displayed (refer to FIG. 18a), which is then followed by the display of graphic components having the next high priority such as "first class road routes", "major buildings" and the like in superposition (refer to FIG. 18b). Finally, all the remaining components are displayed (refer to FIG. 18c). Starting from the basic display procedure described above, there are conceivable two additional display methods which will be mentioned below. According to a first method, a great-sphere map is displayed to be made use of in designating or selecting a specific region from a large scale drawing data base. In this case, a minimum value of the priority given to the component which can be displayed is selected, wherein all the components imparted with the priorities lower than the selected one mentioned above are inhibited from being displayed. For example, when the minimum value of the priority is selected equal to 50 in the case of the example illustrated in FIG. 17, a schematic map including "state or prefecture boundary", "city or town boundary", "shore line", "road route" and the like can be displayed. According to a second method, control is performed in such a manner that the display of a single drawing or map does not require an excessively long time or image as produced does not become excessively fine even when a request for displaying a great amount of drawing or map data is to be dealt with. In the following, this second method will be described.

Figure 19:
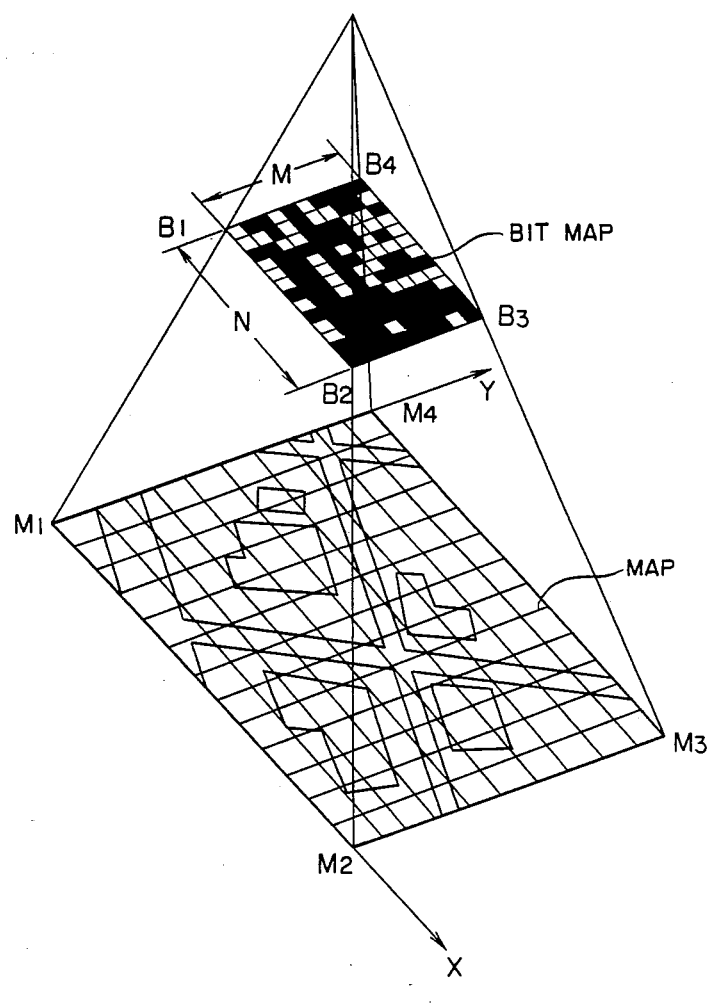
FIG. 19 is a view for illustrating control of image quality or density of display in a map to be displayed.

Referring to FIG. 19, a drawing defined by ($M_1$, $M_2$, $M_3$, $M_4$, $M_1$) is divided into sub-areas, which are then assigned with bits each capable of storing logic "1" or "0" in one-to-one correspondence, to thereby prepare a bit map ($B_1$, $B_2$, $B_3$, $B_4$, $B_5$). In the initial state, all the bits of this bit map are set to "0", and the ratio at which components to be displayed are included in the bit map is arithmetically determined in terms of the number of sub-areas. To this end, the coordinates of points constituting a face or line are represented by (Px, Py), while the coverage of the sub-area is defined by {(Dxmax, Dxmin) (Dymax, Dymin)}. When the conditions that Dxmax≧Px≧Dxmin and that Dymax≧Py≧Dymin are met, a counter indicating the ratio at which the components to be displayed are included is incremented by 1 (one). When the contents of this counter has attained a predetermined value, the value assigned to the corresponding bit map is set to "1". With the aid of the bit maps prepared through a series of procedures mentioned above, it is determined upon completion of display of components assigned with a certain priority whether those components assigned with the next high priority are to be displayed or not in succession. To this end, the number CNT of the bits of logic "1" on the bit map as well as their positions (Xi, Yi) (i=1−N, j=1−M) is determined, being followed by determination of a covariance value DB in accordance with $$DB = \sigma_x^2 \sigma_y^2 (1 - \rho_{xy})$$

where $\sigma_x^2 = \frac{1}{N} \sum_{i=1}^{N} (X_i - \overline{X})^2$, $\sigma_y^2 = \frac{1}{M} \sum_{j=1}^{M} (Y_j - \overline{Y})^2$, $\sigma_{xy} = \sigma_{xy}/\sigma_x\sigma_y$, $\sigma_{xy} = 1/N \sum_{i,j=1}^{MN} (X_i - \overline{X})(Y_j - \overline{Y})$, $\overline{X} = \frac{1}{N} \sum_{i=1}^{N} X_i$, and $\overline{Y} = \frac{1}{N} \sum_{j=1}^{M} Y_j$.

When the conditions that CNT≧NTH and that DB≧DBTH are satisfied, display of the components assigned with the next high priority is inhibited. In dependence on magnitude of the covariance value of the two-dimensional bit map, it is possible to determine dispersion of the graphic components over the whole map or drawing, which in turn means that control may be made to inhibit occurrence of too many sub-areas which have bit densities above a certain value. In this connection, it should however be noted that checking of the overall volume of the components to be displayed on the basis of the condition that CNT≧NTH is to prevent the covariance value DB from assuming a large value in the case where the number of the components is very small, since the covariance may assume a large value even in such case, when the components are located with great distance therebetween.

Next, the display priority control method will be described in concrete by referring to FIG. 2. The display priority control table shown in FIG. 17 is stored in the file equipment. From this table, name of the components which satisfy the priority value or level enabling the display thereof is derived. At that time, coordinate values of graphic patterns and positions of characters to be displayed are retrieved from the file equipment 201 with the aid of the display attributes such as color, pattern factors or the like to be subsequently transferred to the temporary memory 202. By way of example, it is assumed that an item "government offices" to be displayed is retrieved from the priority control table shown in FIG. 17. In that case, a geometrical entity label "GEN1000176" which coincides with "government offices" is obtained from a subject component managing table shown in FIG. 20. The term "geometrical entity label" as used in FIGS. 20 and 22 means the label attached to a set of correlated graphic components. The term "subject" means the label attached to a series of name codes applied to the corresponding graphics, while the term "attributes of subject" means the attributes of the subject matter such as nature of the shore line (e.g. sandy beach, bluff etc.), the number of floors and so forth. Since the subject and the attributes of subject are irrelevant to the invention, further description will be unnecessary. Now referring to FIG. 22, retrieval is proceeded with starting from "FC000102" in the geometrical entity table 11, to "LN001172" of the face table 12 and thence to "PN00100273" of the line table 13 in this order, to finally reach the coordinate values (3076, 2040) which can be displayed as a graphic component. The parameter for designating the manner in which the graphic component thus determined is displayed on the CRT is derived from the display priority control table (FIG. 17) at the column labeled "attributes of display". Referring to FIG. 21 showing the display attributes table, the parameter under consideration for the government offices building No. 4 is represented by slanted lines in green. In connection with the table shown in FIG. 21, the term "display command" represents instruction indicating that a graphic component to be displayed has to be written in superposition on a graphic component written already (command OVR) or it should be inserted under the component written already (command UND).

The processings described above are executed by the CPU 200 by making use of the various tables stored in the file equipment 201 shown in FIG. 2.

The foregoing description has been directed to the managements or processings of the drawings differing from one another in respect to the species and the scale as well as the method of extracting data required for edition and display. Finally, description will be made on a graphic edition system in which data managed and stored on the page-by-page basis are set into continuity to be edited to a unified graphic set having no page boundary, which set is again divided into predetermined pages for storage.

Figure 23:
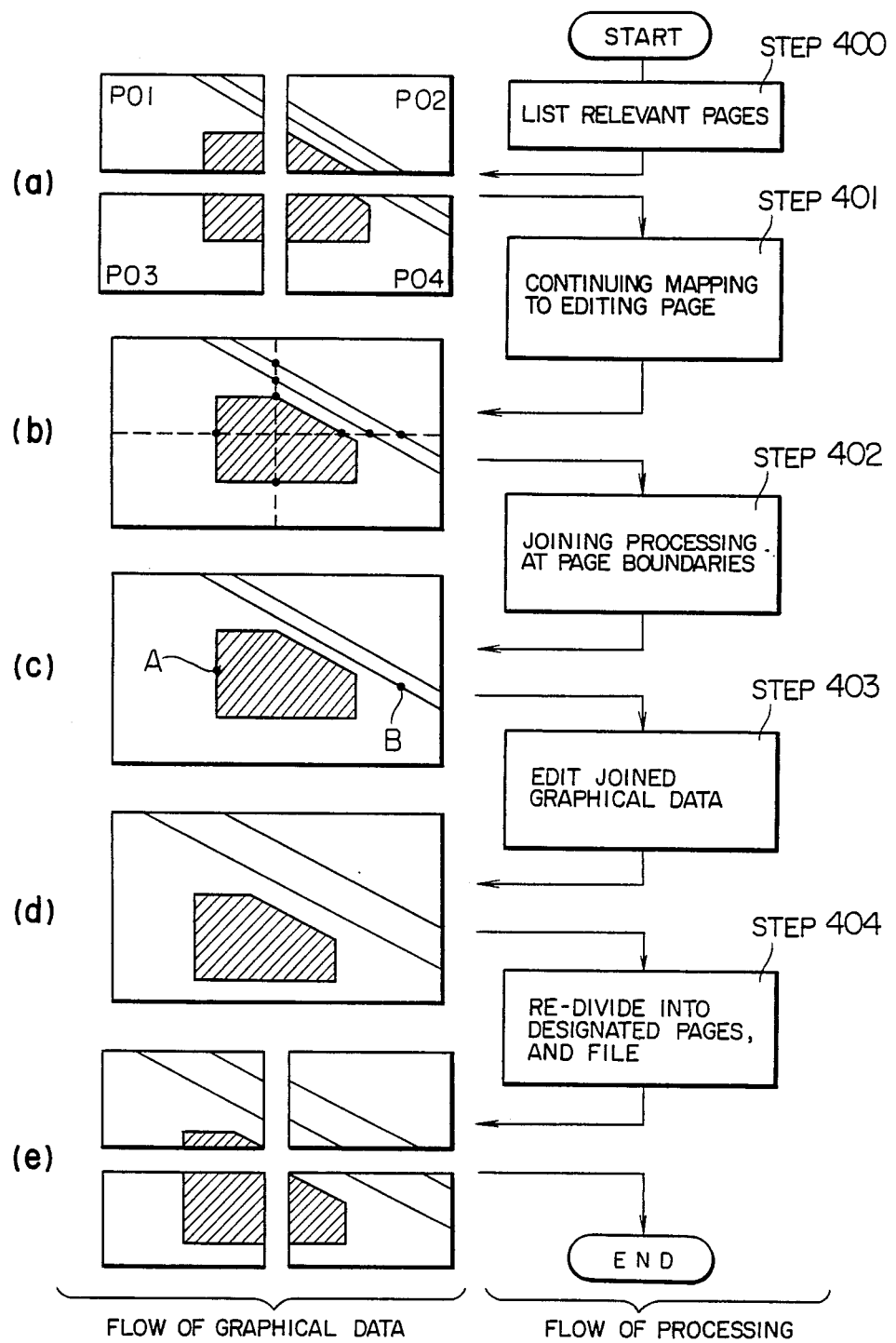
FIG. 23 is a view for illustrating an editing procedure.

FIG. 23 shows schematically the whole procedure for the graphic pattern edition. More specifically, section (a) of FIG. 23 shows the processing steps in a flow chart on the righthand side, while illustrating contents of the graphic data obtained in the source of the processing on the lefthand side. Referring to the figure, all the pages relevant to a region subjected to edition are enumerated in the form of a list (step 400). It is assumed that four pages P01, P02, P03 and P04 are related to the region to be edited, as is illustrated at section (a). All the pages are then mapped to the temporary memory in a continuous manner, as illustrated at section (b) at a step 401. All the pages are integrally combined along the page boundaries to thereby define a combined page for edition, as illustrated at section (c), at a step 402. Edition is performed on the integral graphic pattern thus obtained at a step 403. By way of example, editing operation is performed by moving a face A and a line B as unit graphic components, as illustrated at section (d). The page resulting from the edition is again divided into four original pages to be subsequently stored (step 404).

It is now assumed that the procedure outlined above is applied to a graphic pattern which is divided into four pages illustrated in FIGS. $3a1$, $3a2$, $3a3$ and $3a4$, respectively.

Figures 24, 25:
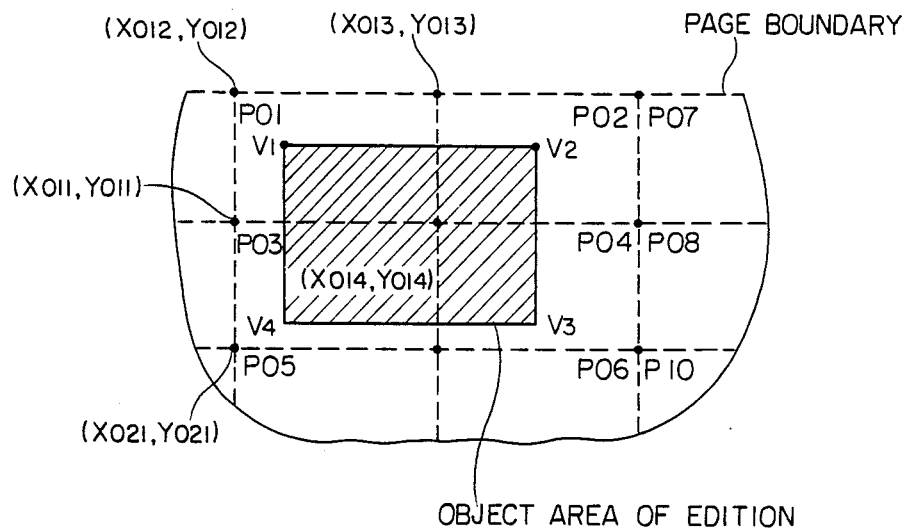
FIG. 24 is a view showing a page offset management table which is consulted in executing the editing procedure.
FIG. 25 is a view for illustrating an area subjected to editing.

In order that the individual pages shown in FIGS. $3a1$ to $3a4$ can be mapped onto the temporary memory 202 in a continuous manner, offset values to be added to the coordinate values of the individual pages are managed by preparing a page offset management table shown in FIG. 24. By way of example, when the contents of the page P01 are to be transferred to the temporary memory 202, the coordinate offset correcting values $(XF_{01}, YF_{01})$ contained in the page offset management table are added to the values $(X, Y)$ of "POINT-TABLE-01", respectively, to obtain modified coordinate values $(X+XF_{01}, Y+YF_{01})$ which are then transferred to the temporary memory.

Next, procedure for listing the correlated pages shown in FIG. 23 at step 100 will be described in more concrete. Referring to FIG. 5, data of the pages related to the region $(V_1, V_2, V_3, V_4)$ to be edited are extracted from the graphic data of plural pages having the page boundaries. By making use of the coordinate values of the page boundary polygon contained in the page offset table shown in FIG. 24 together with coordinate values $(V_1, V_2, V_3, V_4)$ of a polygonal region to be edited (hatched area in FIG. 25), overlapping relation between both polygons is examined. As the result, four pages P01, P02, P03 and P04 are listed up in the case illustrated in FIG. 25.

Next, the procedure for mapping the four pages to a continuous page for edition at the step 401 in FIG. 23 will be described. All the contents registered in the pages resulting from the preceding step are transferred to the temporary memory 202, whereupon procedures mentioned below are performed for defining the page for edition. First, the contents of the face tables (FIGS. $3b1$, $3b2$, $3b3$, $3b4$) and the line tables (FIGS. $3c1$, $3c2$, $3c3$, $3c4$) are rearranged so that a face is constituted by lines connected lockwise before being transferred to the face table ("FACE-TABLE") and line table ("LINE-TABLE") for the page to be edited shown in FIGS. 26b and 26c, respectively. More specifically, the line components whose values of DIRECTION are "1" in the face tables (FIGS. $3b1$, $3b2$, $3b3$, $3b4$), generate new line labels "LN01030" and "LN02030" which are registered in the face table shown in FIG. 26b, while new lines resulting from inversion of the sequential order of points are registered in the line table shown in FIG. 26c at the rows of the above line labels. By way of example, suppose that the contents of the face table shown in FIG. $3b1$ are transferred to the face table shown in FIG. 26b. Since the line "LN0103" in the face table "FACE-TABLE-01" has the "DIRECTION" value of "1", a new line label "LN01030" is generated and registered in the face table of FIG. 26b, while the contents of points "PN0105", "PN0106" and "PN0107" of the line "LN0103" placed in the line table "LINE-TABLE-01" (FIG. $3c1$) are transferred to the line table "LINE TABLE" of FIG. 26c in the order of high to low value of "P-ORDER" and registered as a new line "LN01030". Lines located along the boundaries of pages, e.g. "LN0104", "LN0204", "LN0301" and "LN0404", are treated separately, as described later. On the other hand, the coordinate values of the point tables in FIGS. $3d1$, $3d2$, $3d3$ and $3d4$ are added with the coordinate offset correcting values $(XF_{0i}, YF_{0i})$ (where $i=1$ to 4) of the page offset managing table shown in FIG. 4 and subsequently transferred to the point table "POINT-TABLE" shown in FIG. 26d.

Figures 27A, 27B:
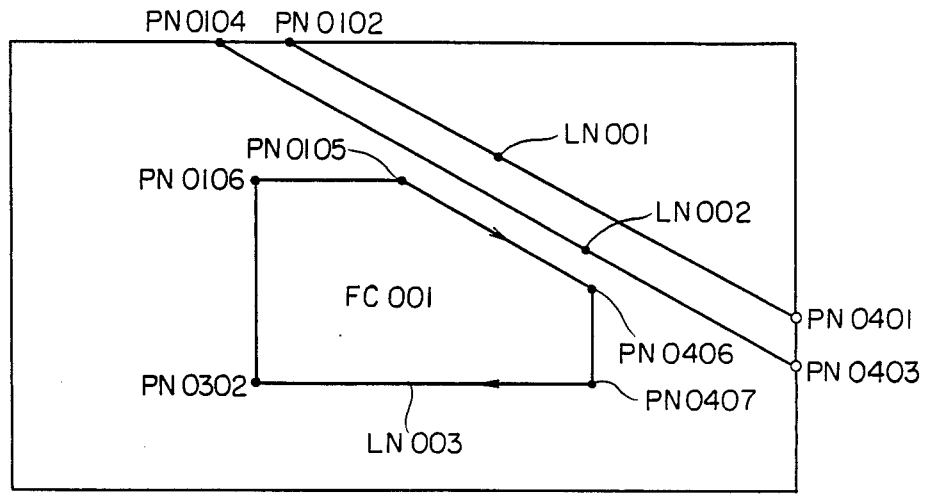

Next, interconnecting processing at the page boundaries illustrated in FIG. 23 at the step 402 will be described. In the face table "FACE-TABLE" and the line table "LINE TABLE" for the page edition prepared through the processings executed to the preceding step, inclusive thereof, there remains discontinuity of the graphic pattern at the boundaries of the individual pages. Accordingly, the interconnecting procedure mentioned below is effected to prepare a continuous page for edition as illustrated in FIG. 27. This procedure can be divided into two major processings.

(1) Line Interconnecting Processing

This processing is intended to interconnect a plurality of adjacent lines so that the coordinate values of the points constituting the lines coincide with one another at the page boundaries, to thereby create a single unified line. This processing may be classified into two cases mentioned below.

(1) First case where the lines located linearly straightly adjacent to each other at the page boundary (e.g. the line LN0101 of the page P01 and the line LN0201 of the page P02) are to be newly defined as a unified straight line by erasing the connecting point between both lines. Before-mentioned U.S. Patents may be referred to regarding judgement of the straightness.

(2) Second case where the adjacent lines located to form a point of inflection on the page boundary (e.g. the line LN01030 of the page P01 and the line LN02030 of the page P02) are to be defined as a new line having a point of inflection at the interconnected point.

Concerning the first case, description will be made on the assumption that the lines LN0101 and LN0201 are to be interconnected. It is further assumed that the contents of the line table for these lines are as follows:

| | LINE-TABLE | |
|---|---|---|
| LINE | POINT | P-ORDER |
| LN0101 | PN0101 | 0 |
| LN0101 | PN0102 | 1 |
| . | . | |
| . | . | |
| LN0201 | PN0201 | 0 |
| LN0201 | PN0202 | 1 |

The points PN0101 and PN0202 whose coordinate values coincide with each other are erased. The contents of a new line extending from the point located in the small-numbered page to the large-numbered page are sequentially transferred to a line location attached with a new line level LN001. Thereafter, the lines LN0101 and LN0201 are erased. As the result, the contents of the above table is updated as follows:

| LINE | LINE-TABLE POINT | P-ORDER |
|---|---|---|
| LN001 | PN0101 | 0 |
| LN001 | PN0201 | 1 |

On the other hand, the line labels of the old line components are replaced by the new line labels, respectively, in the face table "FACE-TABLE". This processing is repeated until all the adjacent line components located linearly straightly across the page boundary are no more present. The second case will be described in conjunction with the interconnection of the lines LN01030 and LN02030 shown in FIG. 26a. It is assumed that the contents of both lines are listed in the line table (FIG. 26c) as follows:

| LINE | LINE-TABLE POINT | P-ORDER |
|---|---|---|
| LN01030 | PN0107 | 0 |
| LN01030 | PN0106 | 1 |
| LN01030 | PN0105 | 2 |
| . | . | . |
| . | . | . |
| LN02030 | PN0206 | 0 |
| LN02030 | PN0205 | 1 |

Figures 26A, 26B:
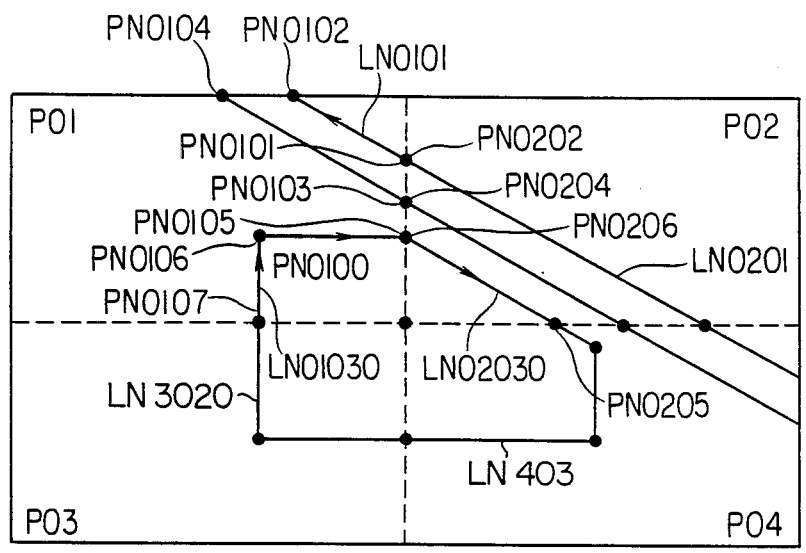

When the points P0105 and PN0206 whose coordinate values coincide with each other at the page boundary make appearance, preference is put on the point belonging to the small-numbered page with the other point being erased. More specifically, the point PN0206 in FIG. 26a is erased. The contents of the lines are sequentially transferred to a location attached with a new line label "LN002". The contents of the above table is now updated as follows:

| LINE | LINE-TABLE POINT | P-ORDER |
|---|---|---|
| LN002 | PN0107 | 0 |
| LN002 | PN0106 | 1 |
| LN002 | PN0105 | 2 |
| LN002 | PN0205 | 3 |

The labels of the old line components are replaced by the new line labels in the face table. This processing is repeated until the points having the same coordinate values on the page boundary are no more present. It should however be mentioned that in both of the first and second cases, the interconnecting processing is not performed on the line which extends on the page boundary in the completely superposed state. By way of example, the line LN0104 of the page P01 (see FIG. 3a1) and the line LN0204 of the page P02 (see FIG. 3a4) coincide completely with the page boundaries, respectively. Accordingly, although these lines include the points PN0105 and PN0206 at which the lines are interconnected, no interconnecting processings are executed.

(2) Face Interconnecting Processing

This processing is intended to define a new face by joining together a plurality of faces which are located at such positions that a part of a side extending along the page boundary is shared in common by the faces. At the stage of the face interconnecting processing, the line interconnecting processing for the lines constituting the face has been completed. Consequently, the face table "FACE-TABLE" contains the contents as follows:

| FACE | FACE-TABLE LINE | L-ORDER | DIRECTION |
|---|---|---|---|
| FC0101 | LN003 | 0 | 0 |
| FC0101 | LN0104 | 1 | 0 |
| FC0201 | LN003 | 0 | 0 |
| FC0201 | LN0204 | 1 | 0 |
| FC0301 | LN0301 | 0 | 0 |
| FC0301 | LN003 | 1 | 0 |
| FC0401 | LN003 | 0 | 0 |
| FC0401 | LN04040 | 0 | 0 |

The face interconnecting processing is executed in a manner mentioned below. The line component which underwent no line interconnecting processing because of the perfect coincidence with the page boundary is erased, while the redundant face labels (e.g. FC0101, FC0201, FC0301 and FC0401) are integrated into a single label "FC001".

Through the line and face interconnecting processings described above, the drawing data mapped onto the temporary memory 202 as the page data for edition are made continuous completely. The resulting contents are illustrated in FIGS. 27a, 27b, 27c and 27d.

Figure 28:
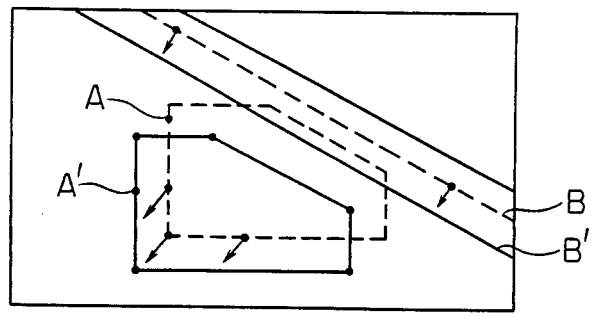
FIG. 28 is a view for illustrating the editing step 103 shown in FIG. 23.

Next, the editing procedure of the continued graphic pattern illustrated at the step 403 of FIG. 23 will be briefly mentioned. This kind of processing can be performed in accordance with a method disclosed in an article titled "The Line Drawing Editor: Schematic Diagram Editing Using Pattern Recongnition Techniques" by John F. Jarnis in Computer Graphics and Image Processing, Vol. 6, (1977). By way of example, referring to FIG. 28, it is assumed that graphic patterns A and B are to be translated to graphic patterns A' and B', respectively. To this end, the graphic data mapped onto the temporary memory as the page for edition are displayed on the CRT 203, while the graphic patterns A and B are designated by making use of the tablet 205 and the stylus 206 and at the same time the reference positions for the translation are designated, whereby the graphic patterns A' and B' can be prepared. Since the edition is simply a translation (i.e. parallel displacement) without modifying any geometric shape of the graphic patterns, the translation processing can be easily accomplished by adding (or subtracting) offset values corresponding to the distance to the destinations to (or from) the values X and Y contained in the point table shown in FIG. 27d. On the other hand, when the geometric characteristics of graphic pattern is to be changed (e.g. when a plurality of graphic patterns are to be integrated to a single graphic pattern), the processing equivalent to the one described hereinbefore in conjunction with the step 402 (FIG. 23) is executed. In contrast, when a single graphic pattern is to be divided into a plurality of patterns, the processing equivalent to the one described in conjunction with the step 404 is performed, as mentioned below.

Figure 29A:
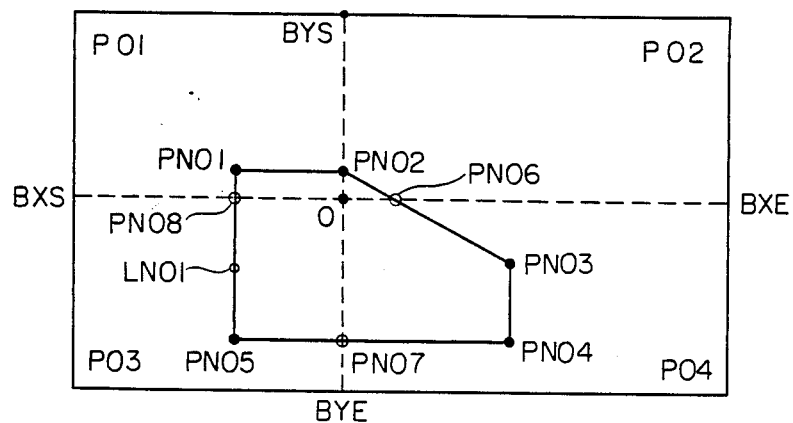

Now, the processing for dividing again a created pattern into designated pages as well as filing processing will be described. This processing corresponds to the step 404 shown in FIG. 23. The graphic pattern which have undergone edition processing in the temporary memory 202, as illustrated in FIG. 28, are again divided along the page boundaries for the purpose of storing the pattern data in the file equipment 201 on the page-by-page basis. As the page boundaries, those contained in the page offset management table shown in FIG. 24, as used in the continuous mapping to the editing page at the step 401 shown in FIG. 23, may be again used. Alternatively, new page boundaries may be employed. In both cases, however, the contents of the division processing are equivalent except the difference in the coordinate values of the page boundaries. The division processing under consideration includes the line division processing and the face division processing. In the first place, the line division processing will be described on the assumption that a graphic pattern defined by (PN01, PN02, PN03, PN04, PN05 and PN01) as shown in FIG. 29a is to be divided along the page boundaries $\overline{BXS\ BXE}$ and $\overline{BYS\ BYE}$, respectively. The graphic pattern shown in FIG. 29a is assumed to be stored in the file equipment 201 in the form of a line table as shown in FIG. 29b. In view of the fact that each side of the graphic pattern to be processed is defined by two points, intersection of each side with the page boundary is determined. Although the side $\overline{PN03\ PN04}$ constituted by the LN01 has no intersection, the sides $\overline{PN02\ PN03}$, $\overline{PN04\ PN05}$ and $\overline{PN05\ PN01}$ intersect the associated page boundaries at points PN06, PN07 and PN08, respectively. For these intersections and the point PN02 at a boundary, at which the sides $\overline{PN01\ PN02}$ and $\overline{PN02\ PN06}$ are interconnected, point labels are duplicated in the line table shown in FIG. 29b2, and the values of "P-ORDER" are renewed to once end and then start at the points on the boundaries, as shown in FIG. 29b2. The content of the line table is divided into a plurality of lines each having a start point with a "P-ORDER" value of "0", i.e. into the unit of page-by-page basis and transferred separately to tables for new pages identified by different labels. Here, when there would be generated two or more line tables belonging to the same page, and defining in fact a continuous line segment, e.g.

| LINE | POINT | P-ORDER |
|------|-------|---------|
| LN01 | PN01  | 0       |
| LN01 | PN02  | 1       |

| LINE | POINT | P-ORDER |
|------|-------|---------|
| LN01 | PN08  | 0       |
| LN01 | PN01  | 1       | these tables are joined at the common point, e.g. PN01, and the values of "P-ORDER" are re-assigned to be continuously increasing, e.g.:

| LINE | POINT | P-ORDER |
|------|-------|---------|
| LN01 | PN08  | 0       |
| LN01 | PN01  | 1       |
| LN01 | PN02  | 2       |

Next, the face division processing will be described. Assuming that the graphic pattern shown in FIG. 29a is defined by data contained in the table as shown in FIG. 30a, the procedure for dividing the face along the page boundaries $\overline{BXS\ BXE}$ and $\overline{BYS\ BYE}$ will be considered. In this connection, it is noted that the line LN01 has been already divided into the four lines LN101, LN201, LN301 and LN401, through the line division processing. Nevertheless, no closed pattern (i.e. face) is produced. This is because the page boundaries constitute part of the lines which will define the divided faces. Of the page boundaries $\overline{BXS\ BXE}$ $\overline{BYS\ BYE}$, the line data of the page boundaries which constitute the divided faces in the clockwise direction are defined, as shown in FIG. 30b1, 30b2, 30b3 and 30b4. With the aid of these line tables in FIGS. 30b1, 30b2, 30b3 and 30b4, face tables allocated for the divided pages are prepared, as is illustrated in FIGS. 31a1, 31a2, 31a3 and 31a4. The face tables, the line tables and the point tables prepared in this way are transferred to the file equipment 201 shown in FIG. 2 to be stored therein.

As will be appreciated from the foregoing description, according to the teachings of the invention, the graphic pattern data or information of drawings such as maps, spreading widely and managed in divided form can be edited in a continuous space without need to consider boundaries of the divided drawings by mapping data continuously onto an editing page. Thus, the editing efficiency of the map data can be significantly improved.

I claim:

1. A method of processing data in different maps in order to display a designated region of interest for editing, said different maps carrying different kinds of information of an area, said area being the same area for each map, each map being sectioned into pages with boundaries between adjacent pages, comprising the steps of:
    establishing positional correspondence between said different maps;
    storing data of said different maps into a file memory in the form of layers wherein each layer comprises the complete data of a different map and wherein each layer is sectioned into pages;
    displaying on a display means a general map of said area, said general map includes information of said different maps;
    designating a region of interest on said general map, said region of interest may include a plurality of pages for at least one of said different maps;
    transferring data within said designated region of interest on said different maps stored in said file memory from said file memory to a temporary memory;
    erasing said boundaries between each pair of adjacent pages in said temporary memory; and
    displaying without boundaries a map of said designated region of interest on said display means for editing.

2. A method according to claim 1, wherein said storing step includes making tables representing elements corresponding to said data of said different maps as positioned within each page, said elements including line elements corresponding to lines between said elements.

3. A method according to claim 2, wherein said erasing step includes unifying tables of gathered pages and connecting lines defining line elements disposed adjacent to each other.

4. A method according to claim 1, wherein said designating step includes designating said region of interest in the display means with a designating means.

5. A method according to claim 1, wherein said designating step includes designating said region of interest by inputting numerical data defining said region of interest.

6. A method according to claim 1, wherein said erasing step includes gathering data on said each pair of adjacent pages and joining data related with the same points on the boundaries of the adjacent pages.

7. A method according to claim 1, further comprising the step of editing data in said map of said designated region of interest.

8. A method according to claim 7, further comprising the steps of dividing the edited map according to said page boundaries of said different maps, and storing the edited data on a page-by-page basis.

9. A method of claim 1, further comprising the steps of collecting data in different layers within said region of interest and displaying the collected data superposedly on the same map.

10. A method according to claim 7, wherein said data in the file memory are designated with predetermined priority values, further comprising the step of displaying data of the same priority level successively in the order of large to small value.

11. A method of editing maps with the aid of file storage means for storing different maps carrying different kinds of information of an area, said area being the same area for each map, each map being arbitrarily sectioned into pages which constitute a continuous map when adjacent pages are connected, data for each map being stored on a page-by-page basis, correlation storage means for storing coordinate correcting values for rearranging said pages in a continuous manner, and temporary storage means for storing said data for executing editing processes of the maps, comprising the steps of:
transferring all map data of the pages successively from said file storage means, and said coordinate correcting values from said correlation storage means to said temporary storage means;
obtaining a continuous map by joining together said pages along boundaries thereof on the basis of said map data and said coordinate correcting values transferred; and
performing graphic editing processes including displacement, joining, and separation.

12. A map editing method according to claim 11, wherein said step of obtaining a continuous map includes erasing lines at the boundaries in the original pages between two adjacent pages.

13. A map editing method according to claim 11, wherein said step of obtaining a continuous map includes erasing end points of line segments located on a boundary of pages when a straight line is produced by joining said line segments, while when said line segments form an inflection on the boundary upon being joined, integrating the end points of said line segments into data of one point defining said inflection.

14. A map editing method according to claim 11, further comprising the step of dividing said continuous map drawing into sub-areas after having undergone said edition processing step.

15. A map editing method according to claim 11, further including steps of inputting a region of interest, and extracting those of said pages of said map which overlap said region of interest, before said transferring step.

16. A map editing method according to claim 15, wherein plural sets of map data are available for a map to be retrieved, further including the steps of extracting the data for these pages overlapping said region of interest from said data sets; performing coordinate translation for the pages as read out to allow all relevant data to be displayed in a single coordinate system.

17. A map editing method according to claim 16, wherein said plural data sets being previously assigned with predetermined priority levels, further comprising the step of displaying the relevant data in the order of said priority levels.

18. A drawing data managing system, comprising:
file storage means for storing data on different maps carrying different kinds of information of an area, said area being the same area for each map, each map having an arbitrary selected coordinate system and being sectioned into a plurality of numbered polygonal shaped pages which constitute a continuous map when adjacent pages are connected at boundaries between the pages, the data being stored on a page-by-page basis;
temporary storage means for temporarily storing data of at least part of said maps to enable processing of said maps;
processing unit means for executing processing on the data stored in said temporary storage means;
storage means for storing data servicing for correlating identification number of each page with its page boundary polygon, relative rotation of the associated coordinate system and coordinate offset values represented in a standard coordinate system;
means for extracting data of a first page of a first map from said extracted file storage means and transferring said data to said temporary storage means;
means for extracting data of a second page of a second map located in said area to be at least partially overlapping on said first page of said first map and determining relative rotation and offset between coordinate systems of said first and second pages; and
means for compensating the positions of data in said second page so that correspondence relation can be established between contents of said first and second pages.

19. A drawing data management system according to claim 18, wherein the map data of a same region is divided into a plurality of pages of different varieties having different boundaries, different coordinate systems and coordinate offset values, and said file storage means also stores such information on page configurations that correspondence can be established among a plurality of pages of different varieties concerning said same region.

20. A drawing data management system according to claim 18, wherein said compensating means performs correcting processing of map data once transferred to the temporary storage means to prepare the pages having predetermined page boundaries, coordinate systems and coordinate offsets so that correspondence among said pages can be established.

21. A drawing data management system, comprising:
file storage means for storing data of a plurality of maps carrying different kinds of information about an area, said area being the same for each map, each map being arbitrarily divided into sub-areas the data being stored on a sub-area-basis;
input means for inputting map data to be stored in said file storage means;
display means for displaying a map including map data retrieved from said file storage means;
operation input means for inputting editorial processing of the map data;

coordinate input means for designating coordinates in said map to be subjected to editorial processing;

temporary storage means for temporarily storing drawing data to enable processing of the map data;

processor unit means for executing the editorial processing at said coordinates designated by said coordinate input means; and means for displaying marks indicating availability of stored data for each of said sub-areas, in superposition on said map displayed by said display means.

22. A drawing data management system according to claim 21, further comprising means for transferring available map data for sub-areas relating to at least partially overlapping a designated area through said coordinate input means from said file storage means to said temporary storage means, for executing information processing.

23. A drawing data management system according to claim 22, wherein in case data is unavailable in said file storage means for the sub-area relating to the designated coverage and pattern element, said processor unit means commands to transfer data from said file storage means to said temporary storage means for a corresponding sub-area relating to the same pattern element and having different reduced scale, if available, for said unavailable data.

24. A drawing display system, comprising:

file storage means for storing data of different maps of an area, assigned with priority levels, the maps including maps carrying different kinds of information, each map being arbitrarily sectioned into a plurality of pages which would constitute a continuous map when adjacent pages are connected at boundaries;

display means for displaying said data of said different maps;

operation input means for inputting requests for the display of said data of different maps;

temporary storage means for temporarily storing said data of said different maps to enable processing of the data of said maps; and processing unit means for executing the processing, wherein said maps are displayed on said display means in the order of said priority levels.

25. A drawing display system according to claim 24, wherein said processing unit means discriminates and allows display of only map data having respective priority levels exceeding a predetermined value.

26. A drawing display system according to claim 24, wherein said processing unit means has criteria for discriminating whether said map data displayed are widely distributed over an area which includes said map data being displayed and making decisions as to whether said criteria is exceeded or not and whether the amount of displayed map data has exceeded a predetermined level at the end of each stage of displaying map data having a certain priority level, to thereby stop subsequent display of map data having lower priority levels.

* * * * *